US009656177B2

(12) United States Patent
Osvald et al.

(10) Patent No.: US 9,656,177 B2
(45) Date of Patent: May 23, 2017

(54) CREW CREATION FOR QUEST PROGRESSION

(71) Applicant: Zynga Inc., San Francisco, CA (US)

(72) Inventors: John Osvald, Albany, CA (US); Michael Waite, Alamo, CA (US); Kyle Sauger, Burlingame, CA (US); Lauren Duncan, San Francisco, CA (US); Erik Nilsson, South San Francisco, CA (US)

(73) Assignee: Zynga Inc., San Francisco, CA (US)

(*) Notice: Subject to any disclaimer, the term of this patent is extended or adjusted under 35 U.S.C. 154(b) by 721 days.

(21) Appl. No.: 13/665,895

(22) Filed: Oct. 31, 2012

(65) Prior Publication Data
US 2013/0079075 A1 Mar. 28, 2013

Related U.S. Application Data

(63) Continuation of application No. 13/244,696, filed on Sep. 26, 2011, now Pat. No. 8,328,643.

(51) Int. Cl.
*A63F 9/24* (2006.01)
*A63F 13/00* (2014.01)
(Continued)

(52) U.S. Cl.
CPC ............ *A63F 13/795* (2014.09); *A63F 13/47* (2014.09); *A63F 13/798* (2014.09); *A63F 13/87* (2014.09); *G06Q 10/101* (2013.01); *G06Q 30/00* (2013.01); *A63F 2300/513* (2013.01); *A63F 2300/556* (2013.01); *A63F 2300/558* (2013.01); *A63F 2300/5533* (2013.01);
(Continued)

(58) Field of Classification Search
CPC .... A63F 13/12; A63F 13/10; A63F 2300/556; A63F 13/795; A63F 13/537; A63F 2300/5553; A63F 13/87; A63F 13/47; A63F 13/798; A63F 2300/5566; A63F 2300/513; A63F 2300/572; A63F 2300/807; A63F 2300/5533; A63F 2300/558; G06Q 10/101; G06Q 30/00
USPC .......................................................... 463/42
See application file for complete search history.

(56) References Cited

U.S. PATENT DOCUMENTS 7,828,661 B1* 11/2010 Fish .................... A63F 13/12
463/42
7,955,175 B1* 6/2011 Holloway et al. ............ 463/42
(Continued)

*Primary Examiner* — Omkar Deodhar
*Assistant Examiner* — Wei Lee
(74) *Attorney, Agent, or Firm* — Martine Penilla Group, LLP

(57) ABSTRACT

Methods, systems, and computer programs for creating a crew to participate in a mission challenge in an online game includes identifying quests to complete the mission challenge. Each quest includes a plurality of tasks and each task includes a plurality of subtasks. A request feed is sent to members of a social graph of a user requesting the members to join the crew and to participate in completing the subtasks of the challenge. Skill set associated with each member of the social graph responding to the request feed is determined and matched with the skill set required for completing each subtask. A distinct subtask is delegated to each member based on the match. Each crew member's progression in completing the challenge is monitored and managed based on the progression made in the delegated subtask. Status of the challenge is updated and shared with the members of the crew.

13 Claims, 22 Drawing Sheets

(51) Int. Cl.
    *G06F 17/00*         (2006.01)
    *G06F 19/00*         (2011.01)
    *A63F 13/795*       (2014.01)
    *A63F 13/47*         (2014.01)
    *A63F 13/798*       (2014.01)
    *A63F 13/87*         (2014.01)
    *G06Q 10/10*         (2012.01)
    *G06Q 30/00*         (2012.01)

(52) U.S. Cl.
    CPC ............... *A63F 2300/5553* (2013.01); *A63F 2300/5566* (2013.01); *A63F 2300/572* (2013.01); *A63F 2300/807* (2013.01)

(56) References Cited

U.S. PATENT DOCUMENTS

| | | | |
|---|---|---|---|
| 8,147,339 B1* | 4/2012 | Perry | 463/42 |
| 2006/0068917 A1* | 3/2006 | Snoddy et al. | 463/42 |
| 2007/0226062 A1* | 9/2007 | Hughes et al. | 705/14 |

* cited by examiner

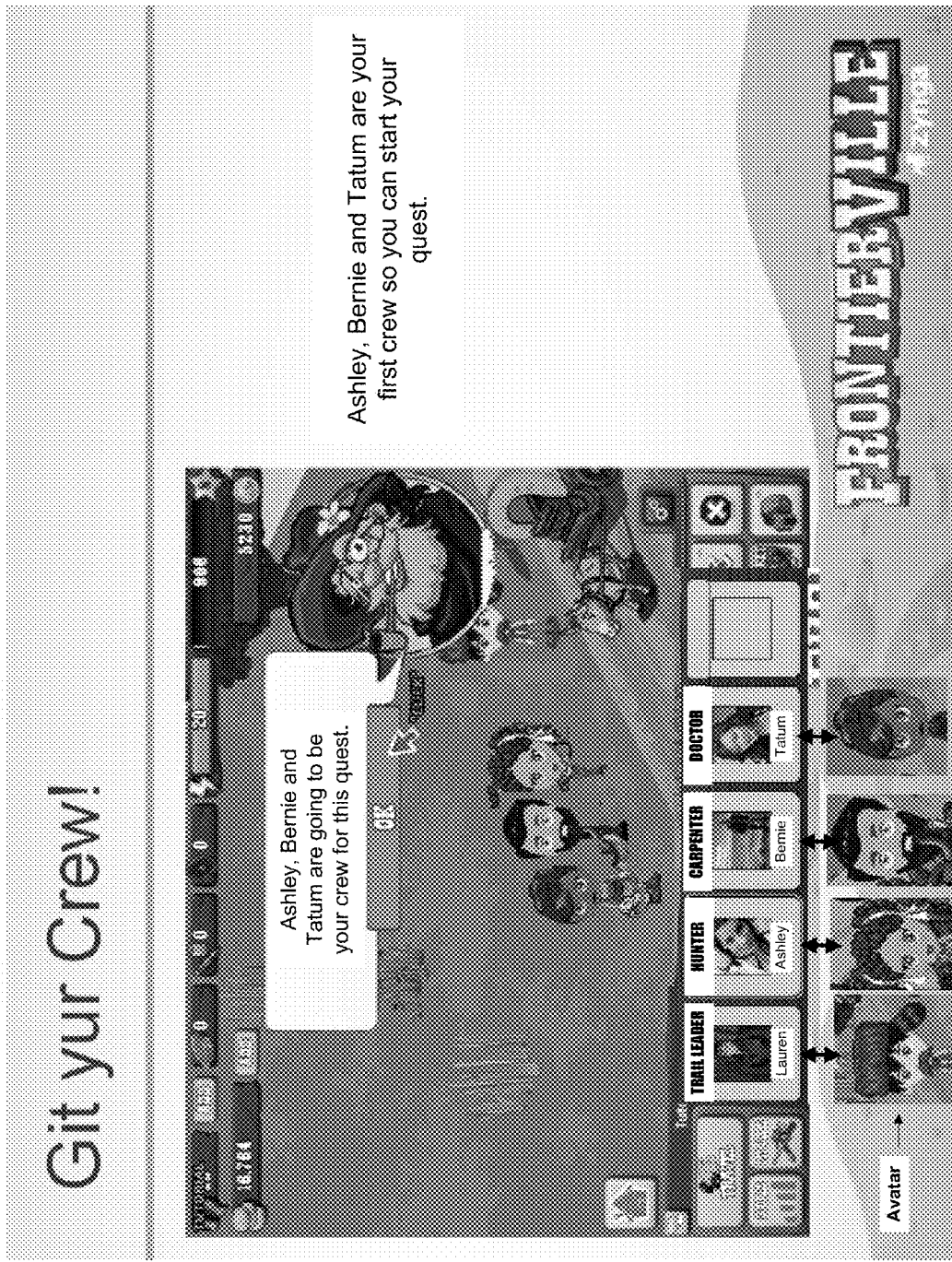

Beaver Valley - Crew Visits!

Crew member visits her Trail Boss's expedition and receives heaps o' rewards.

She collects rewards for every action... and leaves a gift request for the Trail Boss after she's finished.

CREW CREATION FOR QUEST PROGRESSION

CLAIM OF PRIORITY

This application claims priority as a continuation application, under 35 USC §120, of U.S. patent application Ser. No. 13/244,696, entitled "CREW CREATION FOR QUEST PROGRESSION," filed on Sep. 26, 2011, which is incorporated by reference in its entirety.

CROSS REFERENCE TO RELATED APPLICATIONS

This application is related to U.S. patent application Ser. No. 13/079,775 filed Apr. 4, 2011, entitled "Apparatus, Method and System for Crew Mechanics in Multiplayer Games," which is incorporated herein by reference.

BACKGROUND

1. Field of the Invention

The present invention relates to methods for playing online social games.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

Many online games, especially the social network games encourage collaboration between the player and his/her friends in completing the quests. For instance, some online games, such as CityVille™, FarmVille™, use what is called a "neighbor" concept wherein the neighbors (i.e. other players) interact with each other during their game sessions. It would be desirable to have an alternate way for accomplishing various missions of an online game in a fast and efficient manner using help from members within an online game community so as to provide more user satisfaction.

It is in this context that embodiments of the invention arise.

SUMMARY

Embodiments of the present invention provide methods, systems, and computer programs for creating a crew to participate in a mission challenge in an online game. The various embodiments enable a player, initiating the online game, to delegate subtasks that are part of a mission quest to one or more friends and allow the player to monitor and manage progression of the delegated subtasks and of the mission. The embodiments also provide controls to "nudge" a slacking player to become active and participate in accomplishing the assigned subtask. Delegating and closely monitoring the progression of each subtask in the quest enables a user to quickly accomplish the various missions so that additional challenges may be accessed and conquered, leading to greater user satisfaction and involvement in the online game.

In one embodiment, a method for creating a crew to participate in a mission challenge in an online game is disclosed. The method includes identifying quests to complete the mission challenge (or simply challenge). Each identified quest includes a plurality of tasks and each task includes a plurality of subtasks. A request feed is sent to a plurality of members of a social graph requesting the plurality of members of the social graph to join the crew for participating in the completion of the subtasks of the mission challenge. The plurality of members in the social graph have a social relation with a user initiating the online game, wherein the user is a mission leader managing the mission challenge. The skill set of each member of the social graph that responded to the request feed is determined. The skill set is required for completing the one or more subtasks of the mission challenge. A distinct subtask is delegated to each member of the social graph that responds to the request feed by matching the skill set required for completing the subtask with the skill set of each crew member that responded to the request. The delegation enables each crew member of the crew to execute subtasks independent of other members of the crew. Progression of the challenge is monitored and managed based on progression made in the subtasks delegated to the members of the crew and status of the mission challenge is updated based on the progression made by individual members of the crew. The updated status of the challenge is shared with members of the crew.

In another embodiment, a computer server platform for creating crew to participate in a mission challenge in an online game is disclosed. The computer server platform includes one or more game servers, wherein each game server includes a memory and a processor. The memory is operable to store local game state of each member of a crew, local game state of a mission leader and a game state of the online game. The processor is operable to execute an algorithm of the online game, wherein during execution of the online game the algorithm is configured to, identify quests, tasks within each quest and subtasks within each task for completing the mission challenge; send a request feed to a plurality of members of a social graph that have a social relation with a mission leader that initiated the online game requesting the plurality of members to join the crew for participating in completing the subtasks of the mission challenge; receive response to the request feed from one or more of the plurality of members of the social graph; determine skill set associated with each member of the social graph that responds to the request feed, wherein the skill set is required to complete the subtasks of the challenge; delegate a distinct subtask to each member of the crew that responds to the request feed by matching the skill set required for completing the subtask with the skill set of each crew member that responds to the request; monitor and manage progression of the challenge based on progression made in the subtasks delegated to the members of the crew; and update status of the mission challenge shared with members of the crew based on the progression made by each crew member of the crew, wherein the update includes updating local and global game state of each member of the crew, and the game state of the online game.

In another embodiment, a non-transitory computer readable medium having program instructions for implementing a method for creating a crew to participate in a mission challenge in an online game is disclosed. The program instructions include program instructions for identifying quests to complete the mission challenge (or simply challenge). Each identified quest includes a plurality of tasks and each task includes a plurality of subtasks. The computer readable medium further includes program instructions for sending a request feed to a plurality of members of a social graph requesting the plurality of members of the social graph to join the crew for participating in the completion of the subtasks of the mission challenge. The plurality of members in the social graph have a social relation with a user initiating the online game, wherein the user is a mission leader managing the mission challenge. The computer readable medium includes program instructions to determine skill set of each member of the social graph that responded to the request feed. The skill set is required for completing the one or more subtasks of the mission challenge. The computer readable medium includes program instructions to delegate distinct subtask to each member of the social graph that responded to the request feed by matching the skill set required for completing the subtask with the skill set of each crew member that responded to the request. The delegation enables each crew member of the crew to execute subtasks independent of other members of the crew. The computer readable medium further includes program instructions for monitoring and managing progression of the challenge based on progression made in the subtasks delegated to the members of the crew and program instructions for updating status of the mission challenge based on the progression made by individual members of the crew and sharing the updated status of the challenge with members of the crew.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process operations and structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

BRIEF DESCRIPTION OF THE DRAWINGS

The invention may best be understood by reference to the following description taken in conjunction with the accompanying drawings.

FIGS. 10a and 10b illustrate a sampling of crew members for a crew created using a social graph of a user, for participating in mission quests and challenges, in one embodiment of the invention.

DETAILED DESCRIPTION

The following embodiments describe methods, systems, and computer programs for creating a crew to participate in a mission challenge and complete quests in an online social game. It will be apparent, that the present embodiments may be practiced without some or all of these specific details. In other instances, well known process operations have not been described in detail in order not to unnecessarily obscure the present embodiments.

Figure 1:
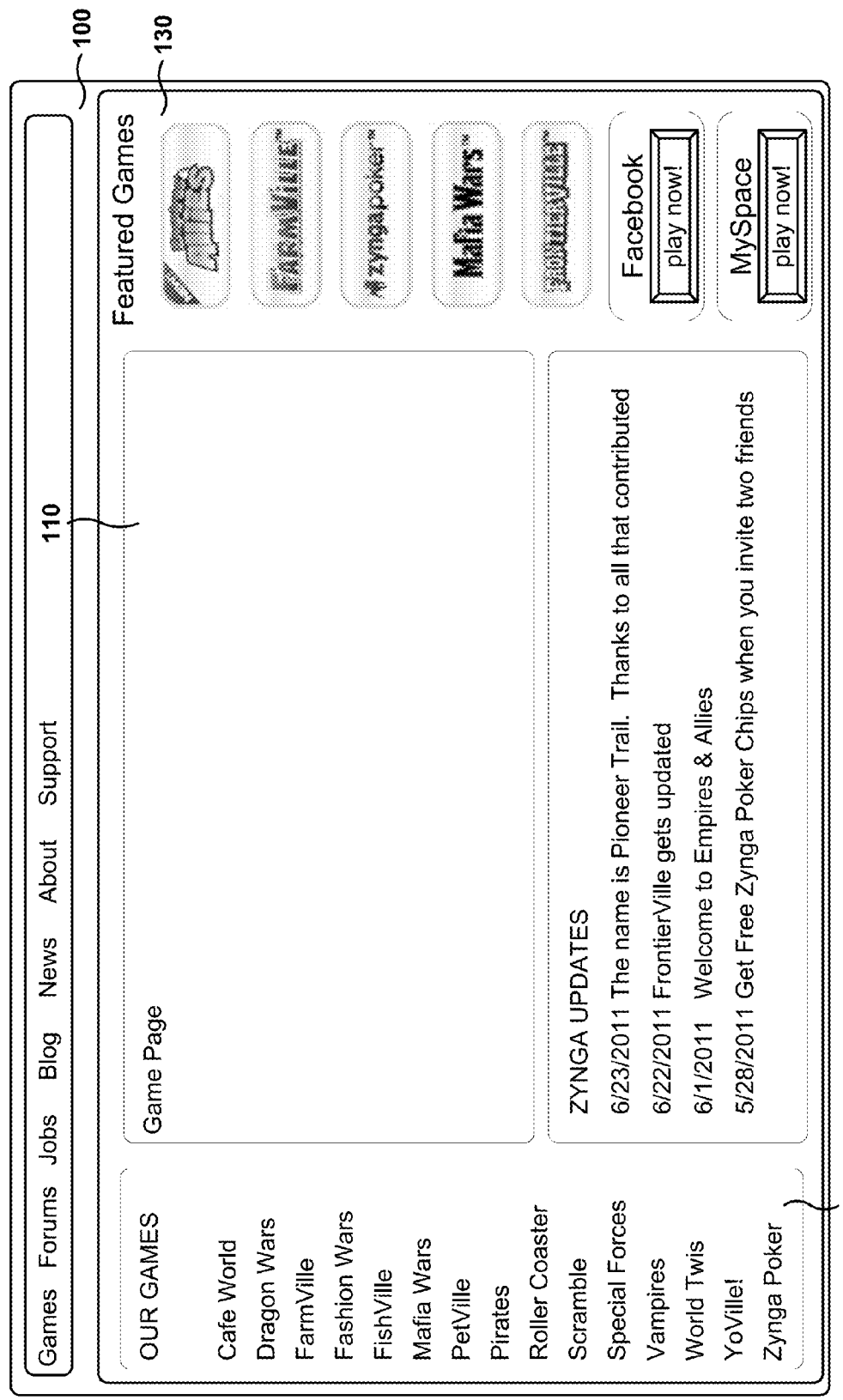
FIG. 1 illustrates an embodiment of a web page for playing an online game.

Game Page, System and Game Architecture:

In order to initiate an online social game, a user may access a webpage either directly or through an online social network. FIG. 1 illustrates an embodiment of a web page 100 for initiating and playing of an online game. A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device. Some web pages are dynamic and are constructed at the time the web page is requested by a network user. As a result, the actual content included in dynamic web pages may vary over time. In addition, web pages may include multimedia content (e.g., image, video, or audio), or embedded references thereto, as well as text content.

Web page 100 is one embodiment of a page designed for playing games online via web browsers. In this embodiment, the web page 100 presents a list of games 120 for selection by the player, as well as a list of featured popular games 130. In one embodiment, the game is played in game area 110 as an embedded component that may use any technology for presenting multimedia dynamic content, such as Hyper Text Markup Language 5 (HTML5), AdobeFlash™, etc.

Adobe Flash (formerly known as Macromedia Flash) is a multimedia platform for adding animation and interactivity to web pages. A Flash component (e.g., game area 110) may be embedded in a web page (e.g., web page 100) to create animation, advertisements, or games and to integrate video into the web page. Adobe Flash can manipulate vector and raster graphics and support bidirectional streaming of audio and video. In one embodiment, Adobe Flash libraries are used with the Extensible Markup Language (XML) capabilities of the web browsers to render rich content in the browsers. This technology is known as Asynchronous Flash and XML.

Another technology for displaying dynamic content in a web page is HTML5. HTML5's features include media playback and offline storage. With HTML4, a predecessor version to HTML5, sites had to reach for Adobe Flash (or Silverlight) to show a video or play music. However, HTML5 lets sites directly embed media using HTML tags (e.g., "<video>" and "<audio>"), and plugins are not required.

In one embodiment, games include objects, such as characters, rewards in the form of currencies, tools/decorations, assets, social relations, etc. For example, in a war game, the characters may be the soldiers fighting on respective sides of the war. In addition, there may be weapons (e.g., spears, guns, swords, wand, etc.) used by the soldiers and objects around the battlefield (e.g., buildings, trees, animals, mountains, rivers, and so on). Each game object may be defined according to a predetermined syntax. For example, the definition of a game object may include shape, texture, physical capabilities, connection or relationship with other game objects, etc.

In another embodiment, a game application is embedded in a web page (e.g., web page 100) and the players play the game via web browsers. The display of a game is sometimes referred to as the "stage" of the game. Thus, the stage of the game may be implemented as Adobe Flash or HTML5 component embedded in the web page. For example, the stage is essentially a data structure that defines some of the basic elements of the game, such as aspect ratio and display size. At any given time, a game scene may be rendered and displayed on the stage by attaching one or more game objects to the stage.

Figure 2:
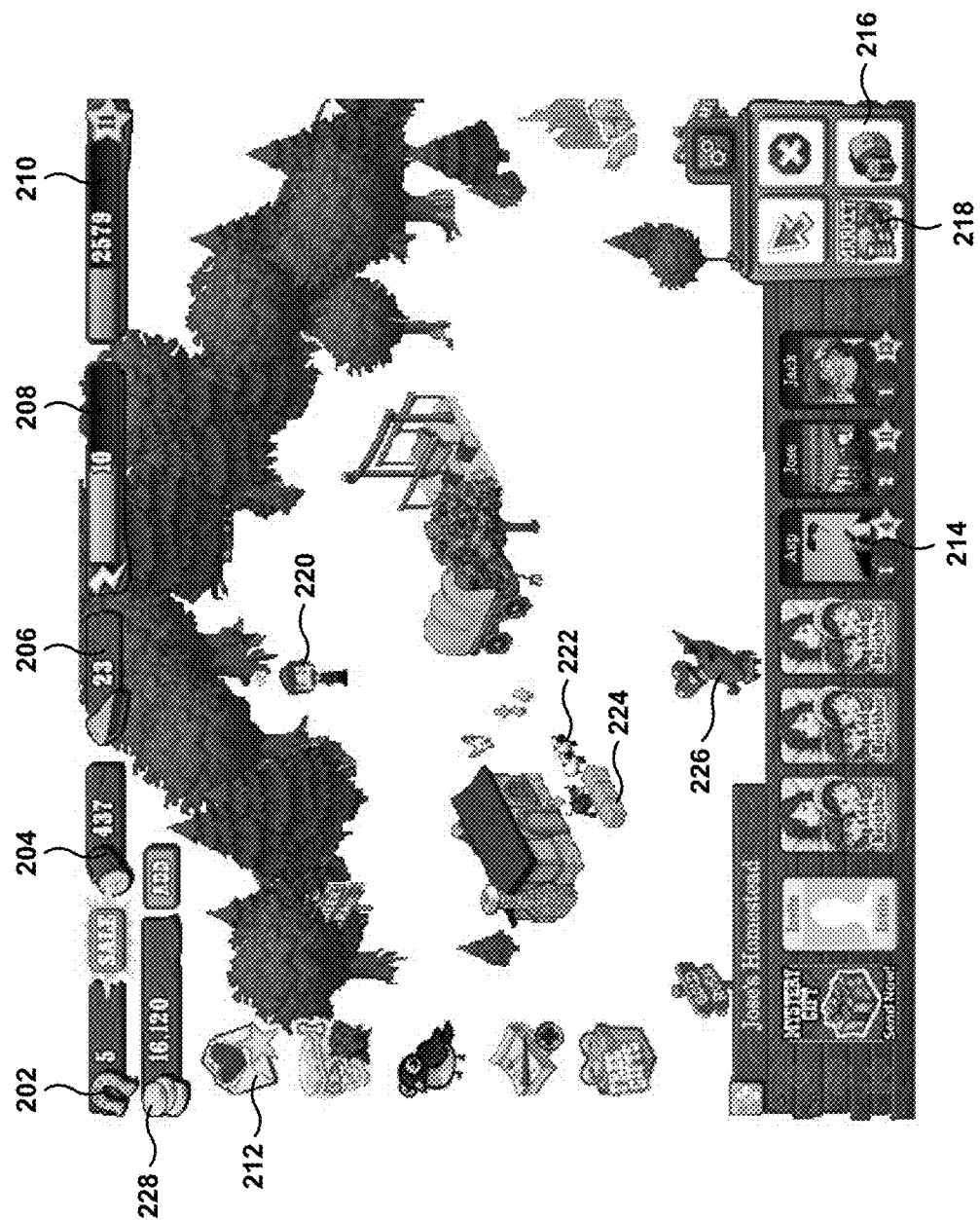
FIG. 2 shows a stage of an online game, according to one embodiment.

FIG. 2 illustrates the stage of an online game, according to one embodiment. The stage of the online game will be briefly described before the embodiments of the invention are described. The online game of FIG. 2 can be played in game area 110 of FIG. 1, but the online game can also be played in other environments. The game may also include avatar 220 for a player initiating the online game, which can be activated (i.e. unlocked) and manipulated through player interaction at the game area 110, such as by clicking the mouse around the play area. For example, if the mouse is clicked somewhere far away from the avatar, the avatar is moved to the faraway place, unless the mouse is clicked on some other game object that causes an in-game action (e.g., if the mouse is clicked on an animal, the avatar feeds the animal).

As the player advances in the game, the player acquires assets, which can take multiple forms. In one embodiment, assets include virtual currency asset 202, wood asset 204, food asset 206, energy asset 208, sheep asset 222, haystack asset 224, dancing bear asset 226, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, virtual currency 202 can be used during the game to make progress in the online game, also referred to herein as advancement. The virtual currency 202 can be used to acquire other assets (e.g., animals, fertilizers, crops), to remove an obstacle in the game (e.g., removing blocks/hurdles that affect/hinder progress), or to complete a subtask or a task (e.g., finish decorating a house). In some online games, such as gambling games, players may purchase assets, such as virtual currency, in exchange for legal currency. The legal currency is transferred using a credit, debit, or charge card transaction conveyed over a financial network. A player interacts with the game server such that the player (or a character (i.e. avatar) controlled by the player) plays an online game in hopes of increasing the assets, such as amount of virtual currency.

As mentioned with reference to FIG. 2, the online game includes quests 212, which identify one or more tasks/missions. Each task/mission includes subtasks that the player must complete before the task/mission is considered satisfied or finished. Upon completion of each subtask, the player is rewarded in some fashion, such as being provided with a new asset, increasing the amount of energy or an asset, getting more virtual currency, etc. As the player successfully completes subtasks, missions and quests, the value of one or more assets and the game score 210 are increased, and as the game score increases the experience level may also increase.

In one embodiment, the avatar of the player is activated (i.e. unlocked) and given an amount of energy as the game starts. Each action that the avatar performs consumes some amount of energy. Once the energy runs out, the avatar cannot perform some of the game actions. The amount of energy may be replenished periodically, or can be increased by trading virtual currency for energy, by consuming food, or as a bonus obtained during game play.

Clicking on inventory icon 216 causes the online game to display a list of all the items or assets owned by the player. In addition, clicking on marketplace icon 218 takes the player to a virtual marketplace where assets can be acquired. Assets can be from within different categories such as crops, trees, animals, buildings, decorations, energy, special items, weapons, etc. Each category includes a plurality of assets within the category. For example, the animal category includes ducks, chickens, goats, sheep, pigs, etc. Some of the items within a category can be freely acquired by the player, while purchasing of some items can be blocked until certain game condition is met, such as reaching some score, finishing a mission, completing a certain level, purchasing the ability to unblock the blocked item, etc.

In one embodiment, avatar 220 might be personalized by the player, i.e., the avatar is defined by a personal expression configured by the player. The personal expression may include type of skin, hair color, mouth, eyes, gender, age, clothing, etc. In one embodiment, the personal expression can be enhanced by acquiring personal-expression assets, such as fancy clothing (e.g., shoes, suits, hats). Acquisition of personal-expression items is made with virtual currency, in one embodiment.

In one embodiment, the online game is an online social game, which leverages social relationships between the player and other online game players socially linked to the player. For example, the player might add a neighbor or a crew member to the game by inviting a friend from a social networking site. There are many types of online social networks run and maintained by various companies, and any one of these companies can provide access to social graph data. One such company, without limitation to others, may include Facebook. Once a friend accepts being a neighbor or a crew member, a social relationship is established in the game where the game played by the player and the game played by the neighbor or crew member can interact with each other. For example, the player might visit the home of the neighbor or crew member and perform some game activities therein, and will be rewarded accordingly. Some of the missions in the game might include social activities that promote the interaction between players. For example, one task/mission might include planting tomatoes in the neighbor's farm. In another example, a task/mission might include collecting tomatoes or medicine in the trail. Therefore, the social interaction can provide advancement for the player, for the neighbor and for the crew member.

It is noted that the embodiments illustrated in FIG. 2 are exemplary. Other embodiments may utilize different assets, missions, social interactions, etc. The embodiments illustrated in FIG. 2 should therefore not be interpreted to be exclusive or limiting, but rather exemplary or illustrative.

Figure 3:
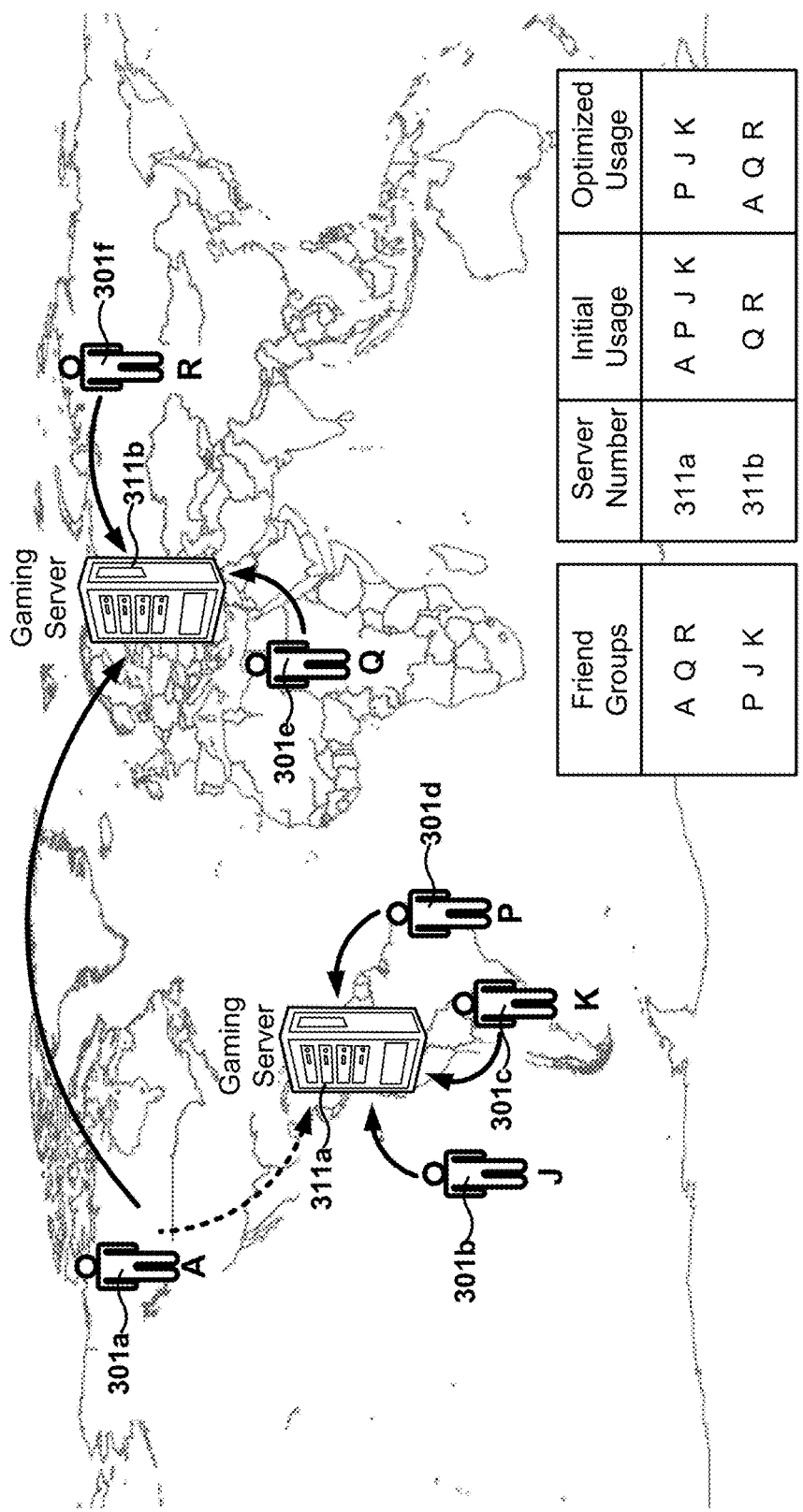
FIG. 3 shows a block diagram illustrating an embodiment of an online-game management architecture.

FIG. 3 shows a block diagram illustrating an embodiment of an online-game management architecture. To encourage desired behaviors (e.g., be more social, spend more money, etc.), online game operators may use social graph information associated with players to determine how players may use their real currency or virtual currency. For example, a player who invites many friends in the user's social graph to play a game may be rewarded with more rewards/points/assets than a player who invited few friends. In another example, a player who helps many friends play the game (e.g., visits, sends gifts, does work for a friend) may be rewarded with special coins that facilitate access to exclusive items, abilities, areas, or the like.

In some implementations, a player of a multi-player online game, (e.g., player A 301a) may play online games with his friends (e.g., player Q 301e and player R 301f). Similarly, player P 301d may have friends player J 301b and player K 301c, which means that player P may play online games with players J and K. In some embodiments, a plurality of gaming servers, also referred to as host, execute the gaming application for the friend groups (e.g., {A, Q, R} and {P, J, K}). In the embodiment of FIG. 3, gaming servers 311a and 311b host the player groups.

Players within a single friend group may be hosted by different gaming servers, while playing the same game with each other, or may be hosted by the same gaming server. In one scenario, players A, Q, and R are playing the same game with each other. Initially, gaming server 311a hosts player A and gaming server 311b hosts players Q and R. However, during game play, player A may be moved to gaming server 311b so the three players A, Q, and R are hosted by the same gaming server.

In some implementations, a gaming server (e.g., 311a, 311b) may host players from a plurality of player groups. For example, gaming server 311a may be hosting player A from group {A, Q, R} and players P, J, and K from group {P, J, K}. The gaming server performs computations necessary to provide gaming services for each of the hosted players, and provides responses to various queries provided by the hosted players. In some embodiments, a hosted player may observe gaming server response times for each of the user's queries that are dependent on the number of players hosted by the gaming server when the player presents the queries to the gaming server.

In one embodiment, a gaming server may identify an overloaded gaming server. In the scenario of FIG. 3, gaming server 311a is overloaded while hosting players A, P, J and K. The gaming platform may transfer one or more players hosted by the overloaded gaming server to other gaming servers, so as to reduce the load experienced by the currently overloaded gaming server. For example, player A is transferred from gaming server 311a to gaming server 311b. In one embodiment, players may be transferred based on the social network and online behavioral activities of the user. For example, player A is identified as a transfer candidate to gaming server 311b based on player A's friendship with players Q and R already hosted by gaming server 311b, or based on the observation that player A's gaming times overlap with those of players Q and R already hosted by gaming server 311b.

Figure 4:
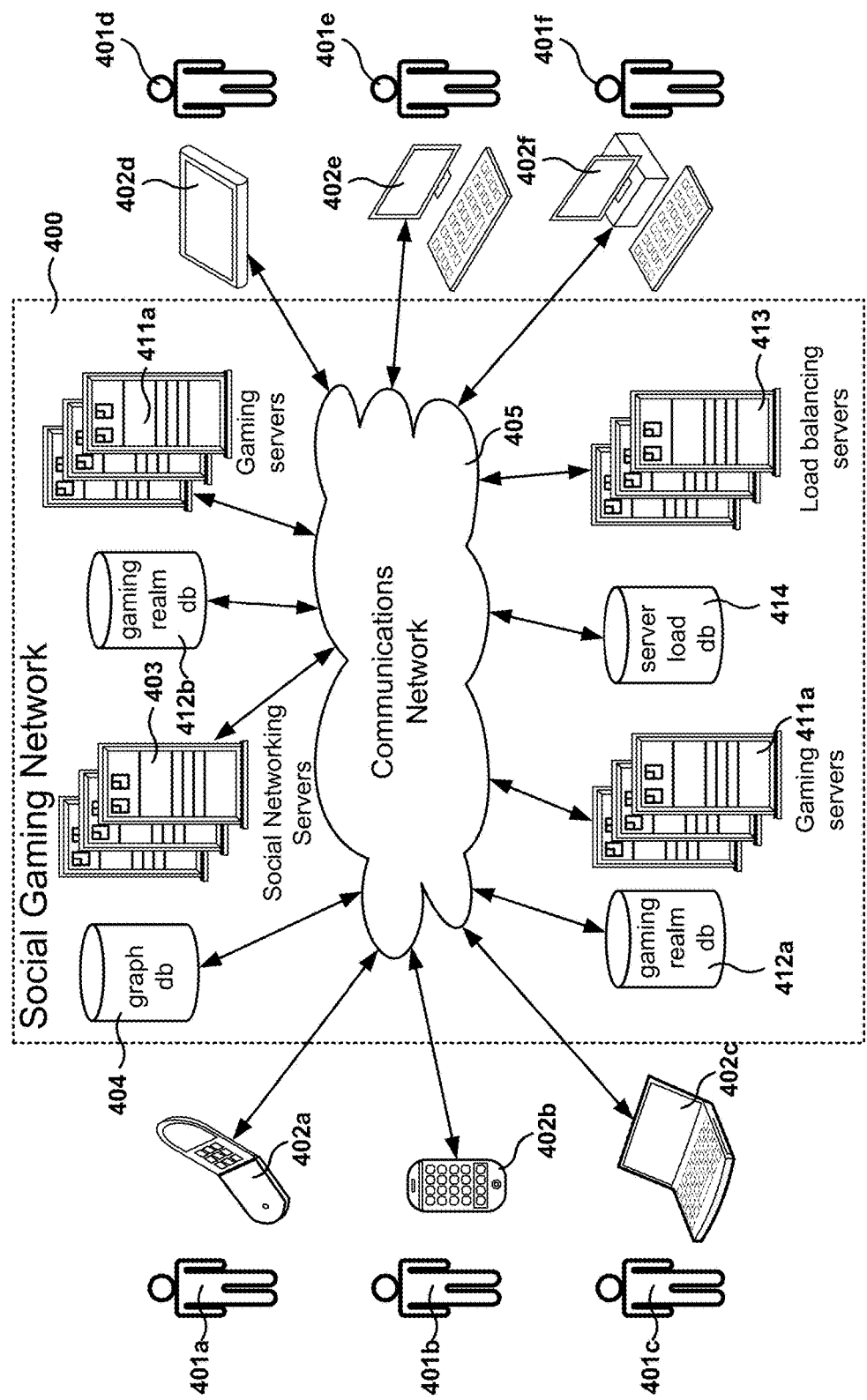
FIG. 4 shows a block diagram illustrating a social gaming network architecture, according to one embodiment.

FIG. 4 shows a block diagram illustrating a social gaming network architecture, according to one embodiment. In some implementations, a plurality of players (e.g., 401a-401f) may be utilizing a social gaming network 400. Each player interacts with the social gaming network via one or more client devices (e.g., client devices 402a-402f). The clients may communicate with each other and with other entities affiliated with the gaming platform via communications network 405. Further, the players may be utilizing a social networking service provided by a social networking server (e.g., social networking servers 403) to interact with each other.

When a player provides an input into the player's client device, the client device may, in response, send a message via the communications network to the social networking server. The social networking server may update the player profile, save the message to a database, send messages to other players, etc. The social gaming network may include a social graph database 404, which stores player relationships, social player profiles, player messages, and player social data.

The gaming servers host one or more gaming applications, and perform the computations necessary to provide the gaming features to the players and clients. One or more gaming realm databases (e.g., 412a-412b) store data related to the gaming services, such as the gaming applications and modules, virtual gaming environment ("realm") data including game state, player gaming session data including player asset state, player status, player scores, player virtual gaming profiles, game stage levels, etc. The gaming servers may utilize the data from the gaming realm databases to perform the computations related to providing gaming services for the players. In some implementations, a server load database 414b stores gaming server load statistics, such as computational load, server responses times, etc. The social gaming network may include a load balancing server 413.

Figure 5:
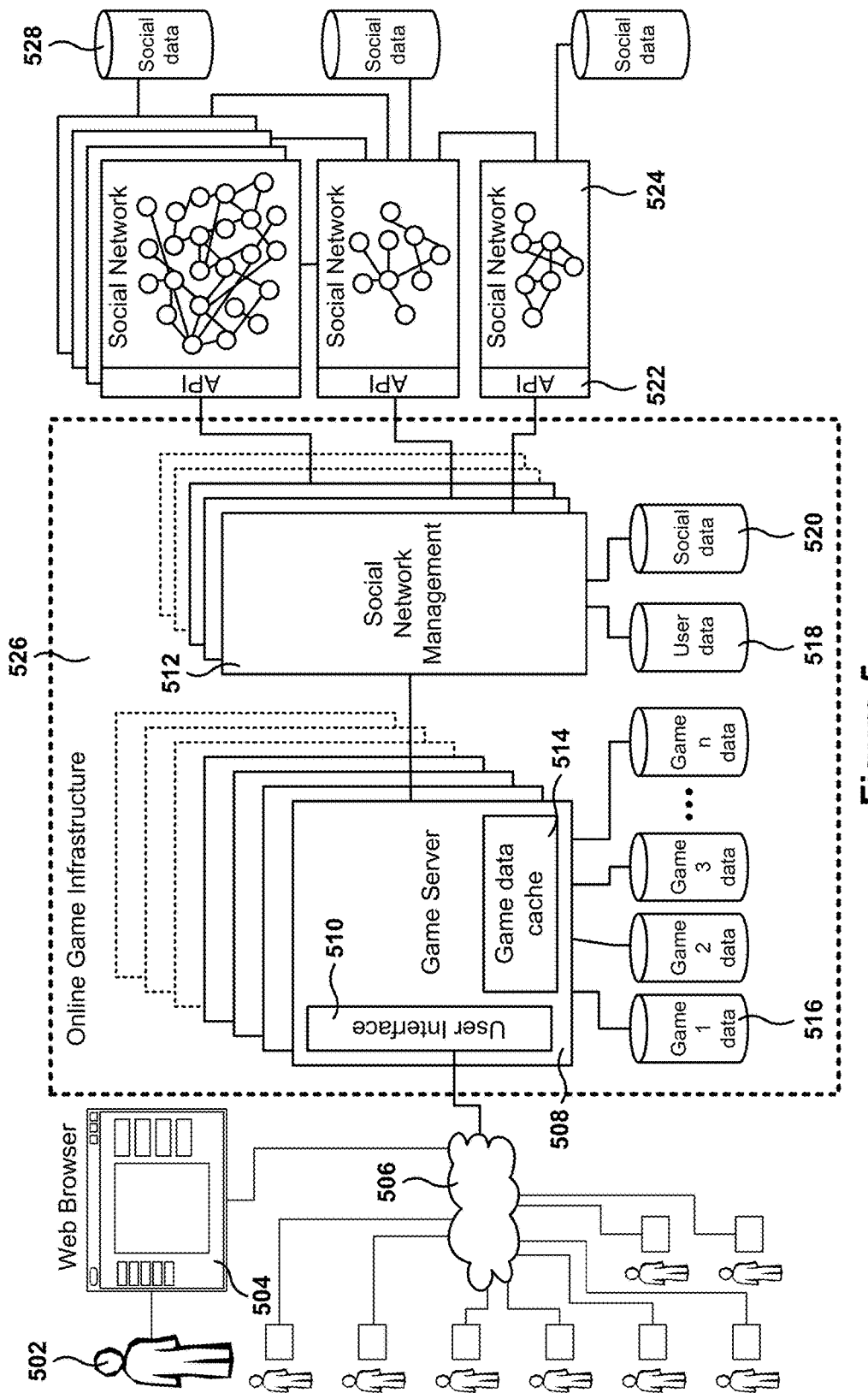
FIG. 5 illustrates an implementation of a Massively Multiplayer Online (MMO) infrastructure, according to one embodiment.

FIG. 5 illustrates an implementation of an online game infrastructure, according to one embodiment. The online game infrastructure 526 includes one or more game servers 508, web servers (not shown), one or more social network management servers 512, and databases to store game related information. In one embodiment, game server 508 provides a user interface 510 for players 502 to play the online game. In one embodiment, game server 508 includes a Web server for players 502 to access the game via web browser 504, but the Web server may also be hosted in a server different from game server 508. Network 506 interconnects players 502 with the one or more game servers 508.

Each game server 508 has access to one or more game databases 516 for keeping game data. In addition, a single database can store game data for one or more online games. Each game server 508 may also include one or more levels of caching. Game data cache 514 is a game data cache for the game data stored in game databases 516. For increased performance, caching may be performed in several levels of caching. For instance, data more frequently used is stored in a high priority cache, while data requiring less access during a session will be cached and updated less frequently.

The number of game servers 508 changes over time, as the gaming platform is an extensible platform that changes the number of game servers according to the load on the gaming infrastructure. As a result, the number of game servers will be higher during peak playing times and lower during off-peak hours. In one embodiment, the increase or decrease of bandwidth is executed automatically, based on current line usage or based on historical data.

One or more social network management servers 512 provide support for the social features incorporated into the online games. The social network management servers 512 access social data 528 from one or more social networks 524 via Application Programming Interfaces (API) 522 made available by the social network providers. Each social network 524 includes social data 528, and this social data 528, or a fraction of the social data, is made available via API 522. As in the case of the game servers, the number of social network management servers 512 that are active at a point in time changes according to the load on the infrastructure. As the demand for social data increases, the number of social network management servers 512 increases. Social network management servers 512 cache user data in database 518, and social data in database 520. The social data might include the social networks where a player is present, the social relationships for the player, the frequency of interaction of the player with the social network and with other players, etc. Additionally, the user data kept in database 518 may include the player's name, demographics, e-mail, games played, frequency of access to the game infrastructure, etc.

It is noted that the embodiment illustrated in FIG. 5 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 5 should therefore not be interpreted to be exclusive or limiting, but rather exemplary or illustrative.

Figure 6:
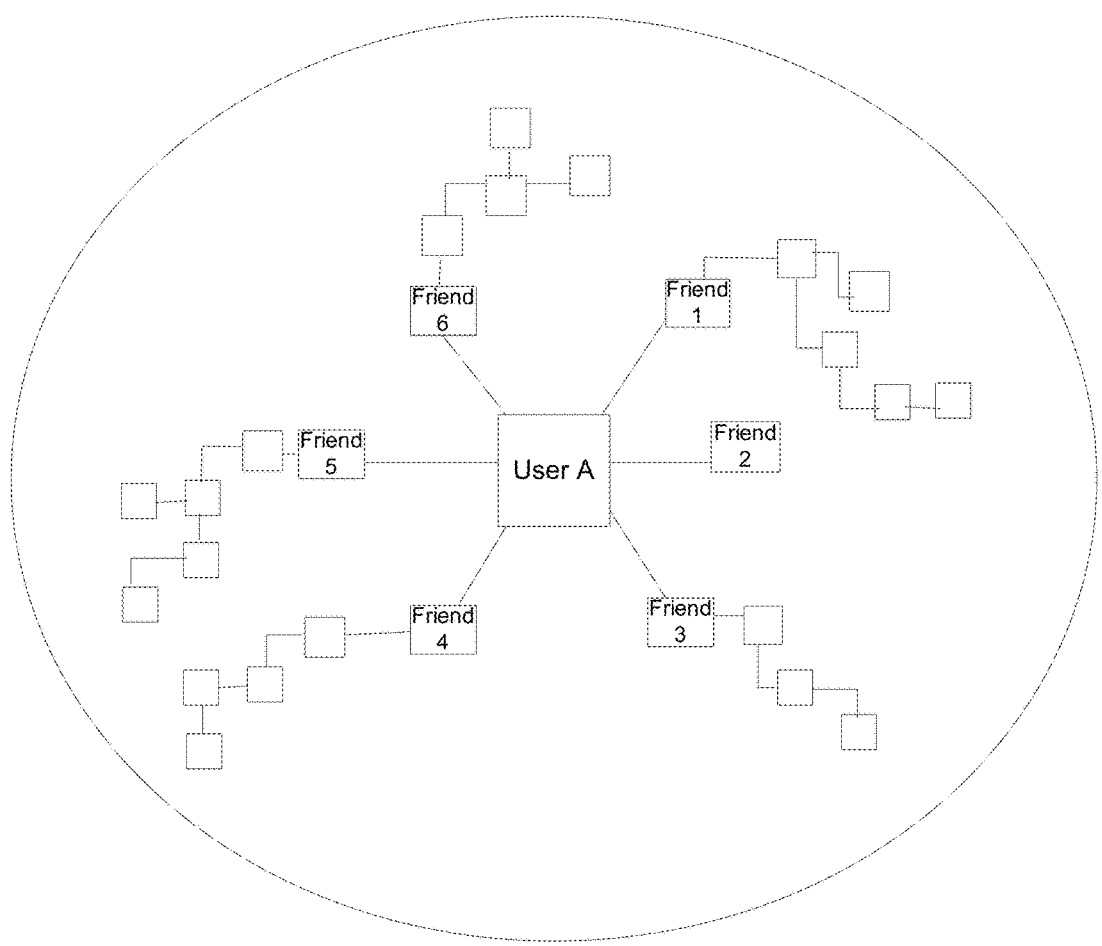
FIG. 6 illustrates a social graph of a user that is used in creating a crew for an online game initiated by a user, in one embodiment of the invention.

Crew Creation Mechanics:

With the general understanding of the web page to activate an online game, game stage, game management architecture, social gaming network architecture, and online game infrastructure, embodiments of the invention will now be described with reference to the remaining figures. FIG. 6 illustrates a sample structure of a social graph of a user who initiates an online social game. The social graph of a user includes a circle of friends and each friend in the circle has his/her own circle of friends. In one embodiment of the invention, the social graph may be generated using information provided by one or more social networking sites, such as Facebook™, Linkedin™, Yahoo! ™, Google™, etc. The social graph identifies friends that have a social relation with the user. Thus, as illustrated in FIG. 6, user A's social graph identifies user A's friends F1, F2, F3, F4, F5 and F6 with friend F1 having 5 friends, friend 3 having 3 friends, etc. When user A initiates an online social game with a plurality of quests, the information from the user A's social graph is dynamically obtained from a social networking site and a request feed is sent to the circle of friends of user A requesting for their assistance in completing the quests in the online game.

Figure 7:
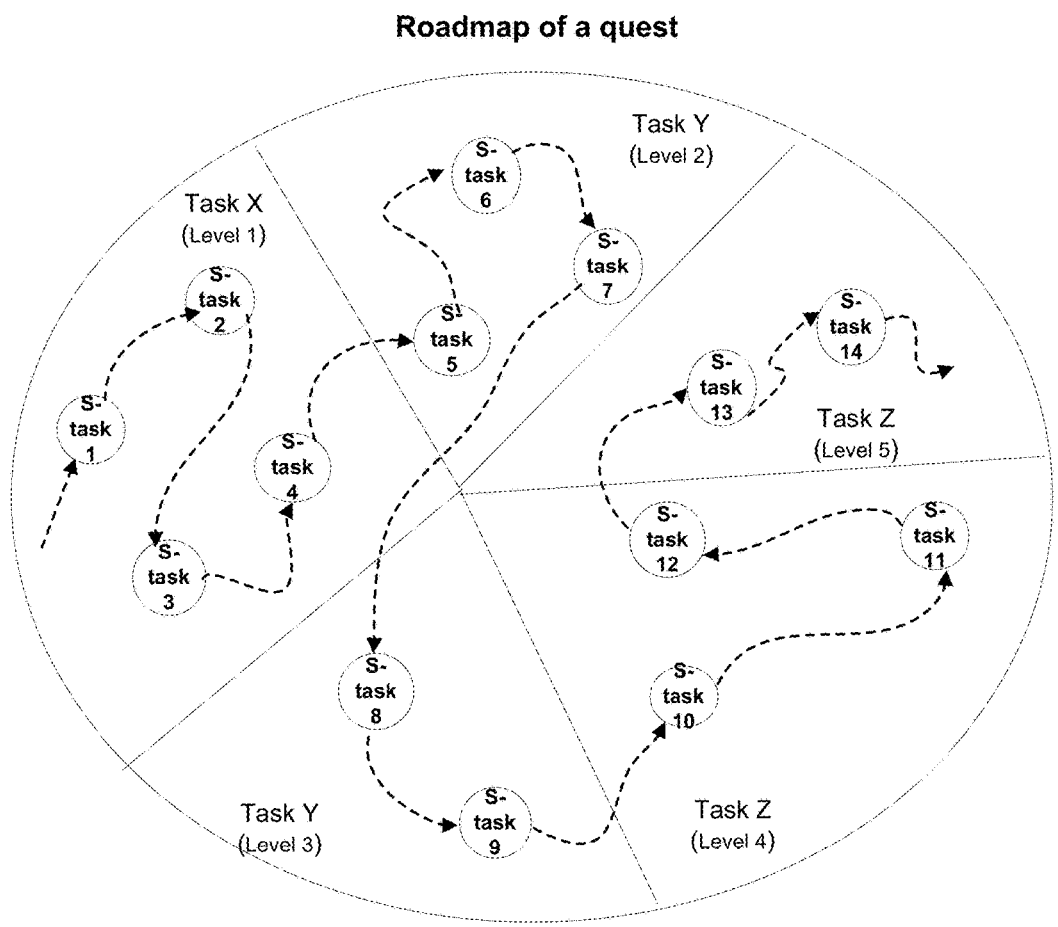
FIG. 7 illustrates a trail map highlighting a quest with tasks and subtasks within the quest of the online game, in one embodiment of the invention.

FIG. 7 illustrates an exemplary game layout of an online social game initiated by a player. In the various embodiments illustrated in the drawings and described herein, a player is a user of the online social game that initiates the online game. The online game includes a plurality of quests and each quest includes a plurality of tasks (otherwise called missions). Each task includes a plurality of subtasks. Each subtask identifies a specific focus. One or more tasks are part of a game level. Each game level may have a distinctly defined set of rewards or points for participating in each subtask within a task, each task within a particular level, and for each quest in the online game. Participating, as used in this application, can be broadly described to include one or more of being assigned a subtask within a mission challenge, attempting the assigned subtask, at least partially completing the assigned subtask and/or completing the assigned subtask satisfactorily. As the player progresses through the online game and completes subtasks, tasks/missions in a level, rewards or points are awarded to the player as incentive for finishing the subtasks and tasks/missions of the quest.

Figure 9A:
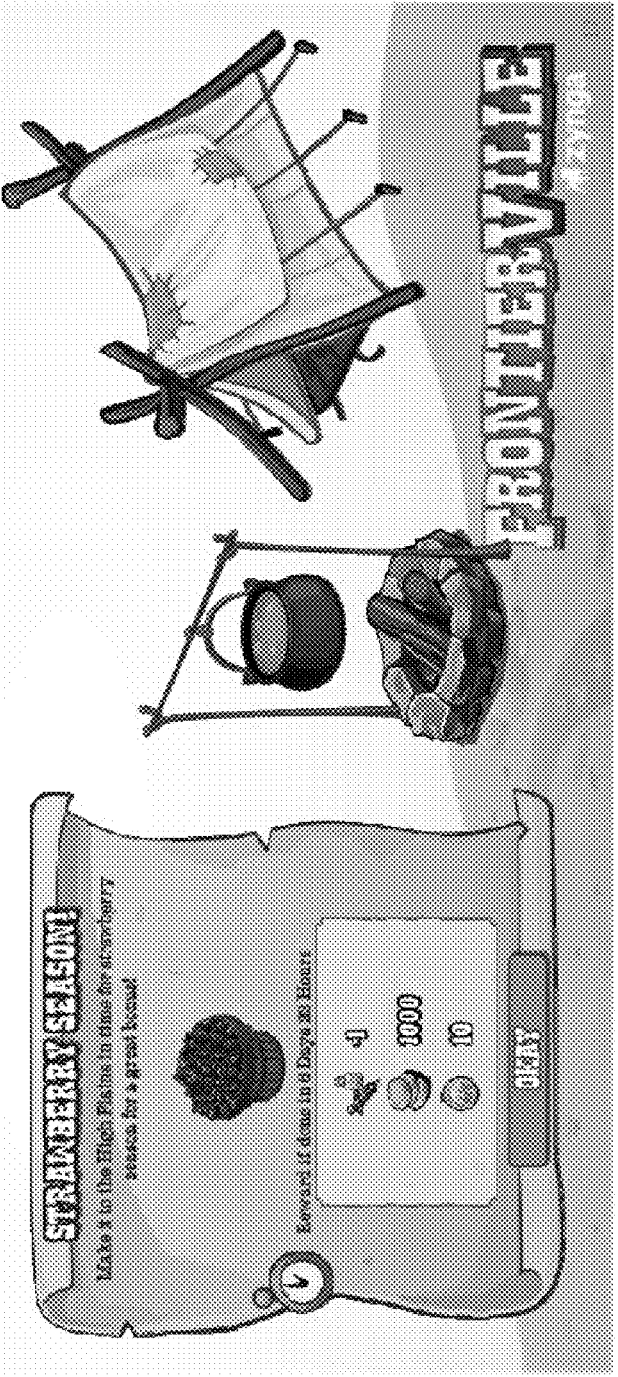
FIGS. 9a and 9b illustrate a sampling of missions for a quest in the online game, in one embodiment of the invention.
Figure 9B:
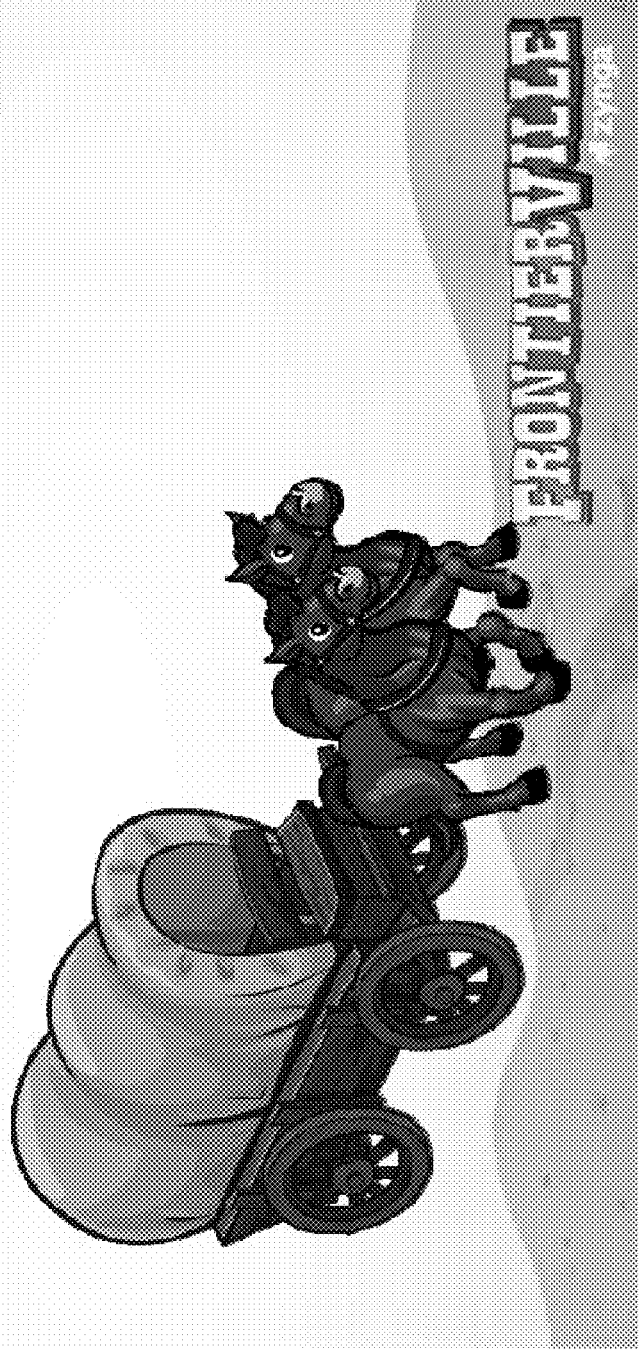

In addition, as the player progresses through various levels, additional incentives may be awarded in the form of rewards/points, gifts or unlocking additional challenging quests. For instance, in an online social game such as FrontierVille™ from Zynga, Inc., the assignee of the current application, a quest may include Beaver Valley. The Beaver Valley quest may include a plurality of missions/tasks. FIGS. 9a and 9b illustrate a list of mission/tasks that need to be accomplished within the Beaver Valley quest. Thus, for instance, in the Beaver Valley quest, missions/tasks may include "Clear the Campsite", "Trailside Stew", "Settin' Up Camp," etc. Clear the Campsite task may include subtasks, such as "collect wood for the fire," "collect rocks for the fire pit," etc. Similarly, the subtasks within the task, "Settin' Up Camp" may include "feed yer critters", "pitch yer tent," etc. It should be noted that the list of missions illustrated in FIGS. 9a and 9b are exemplary and are provided for general understanding of the invention. Consequently, the list of missions of FIGS. 9a and 9b should not be considered restrictive.

Each subtask identifies a specific focus that requires a specific skill set from the player or user. For instance, the collect wood and collect rocks subtasks may require the skill set of a carpenter, "feed yer critter" subtask may require the skill set of a hunter, etc. The quests, tasks and subtasks described above with reference to FIGS. 9a and 9b are exemplary and is used for illustrative purposes. It should be noted that the quests, tasks and subtasks may include fewer, more or different types of quests, tasks, subtasks and each subtask may have different focus than what is illustrated.

As used herein, "skill set" maybe be broadly understood to mean some knowledge level or understanding level of a task, or some level of experience or use by a user. In some cases, the level of understanding can be learned, so even a beginner that just starts playing can be considered to have some skill set level, while some users with more experience can be thought of having a larger skill set level. In one embodiment, the skill set can be determined based on experience or amount of use or interaction with the game, either in a present session or based on a sum of all past sessions. The skill set can also be computed numerically, and the numeric value can be weighted based on user experience, use habits, rewards accumulated or amount of money spent during game sessions. The numeric value can, in some cases be scaled down or up, based on a number of factors. In one embodiment, the "skill set" may be used as a gauge to rate user usage, experience, game loyalty, past reward accumulation, money spent on the game, or a combination thereof. In one embodiment, the skill set can be dynamically adjusted over time as users progress through game play, and the skill set value or level can be saved to a server for future recall and use by the game execution engine.

Each of the subtasks and tasks may be performed by the player with the help of a crew. In some approaches for playing an online game, the tasks and subtasks of the online game were accomplished by the player alone or with help from one or more neighbors. When the player plays alone, the subtasks and tasks are completed slowly and the quest takes a long time to complete. When the player seeks the help of neighbors, the online game progresses faster and the quests get completed faster than when the player worked alone. However, in the case when neighbors help the player complete the subtasks and tasks, the neighbors can only assist the player in a subtask or task that the player has currently started/embarked. As a result, the subtasks are completed sequentially as the player moves through the various tasks/missions.

In order to complete the online game faster, the player may seek and receive help from friends in his social graph. In the case when the player seeks, recruits members from his social graph to be part of his crew, and receives assistance in completing the missions in the online game from the members of his crew, the subtasks and tasks are completed faster than when the player plays alone or seeks the help of neighbors. This is due to the fact that each of the subtasks are assigned and completed independent of one another. In one embodiment, each crew member assigned a particular subtask may have a specific skill set for completing the assigned subtask. As a result, the subtasks of the task/mission are delegated to different members of the crew based on each member's skill set and the crew members finish the assigned subtasks in parallel resulting in faster completion of the mission and, hence, the quests that the player has embarked on in the online game. In another embodiment, the crew members may not need or have the skill set to accomplish the subtasks. In this embodiment, the crew members accomplish the assigned subtasks by following a task leader who has the specific skills. The task leader, for instance, may include a hunter, a doctor, a carpenter, etc. For instance, the hunter may possess the tools and capabilities to follow a prey and hunt or may possess the skill set/requirements to wield the tools. Similarly, the doctor may have the tool set/knowledge to gather medicines and the carpenter may have the toolset, knowledge, capability to cut, gather and stack wood and to collect/recover parts from buildings/objects.

In one embodiment, based on the assigned skill (e.g., hunter), the game mechanics will assign the user's avatar with capabilities that are commensurate with the types of skills needed to complete the specific tasks. Once again, the task leaders and the skill sets for accomplishing the subtasks are exemplary and are used for illustrative purposes.

Figure 8A:
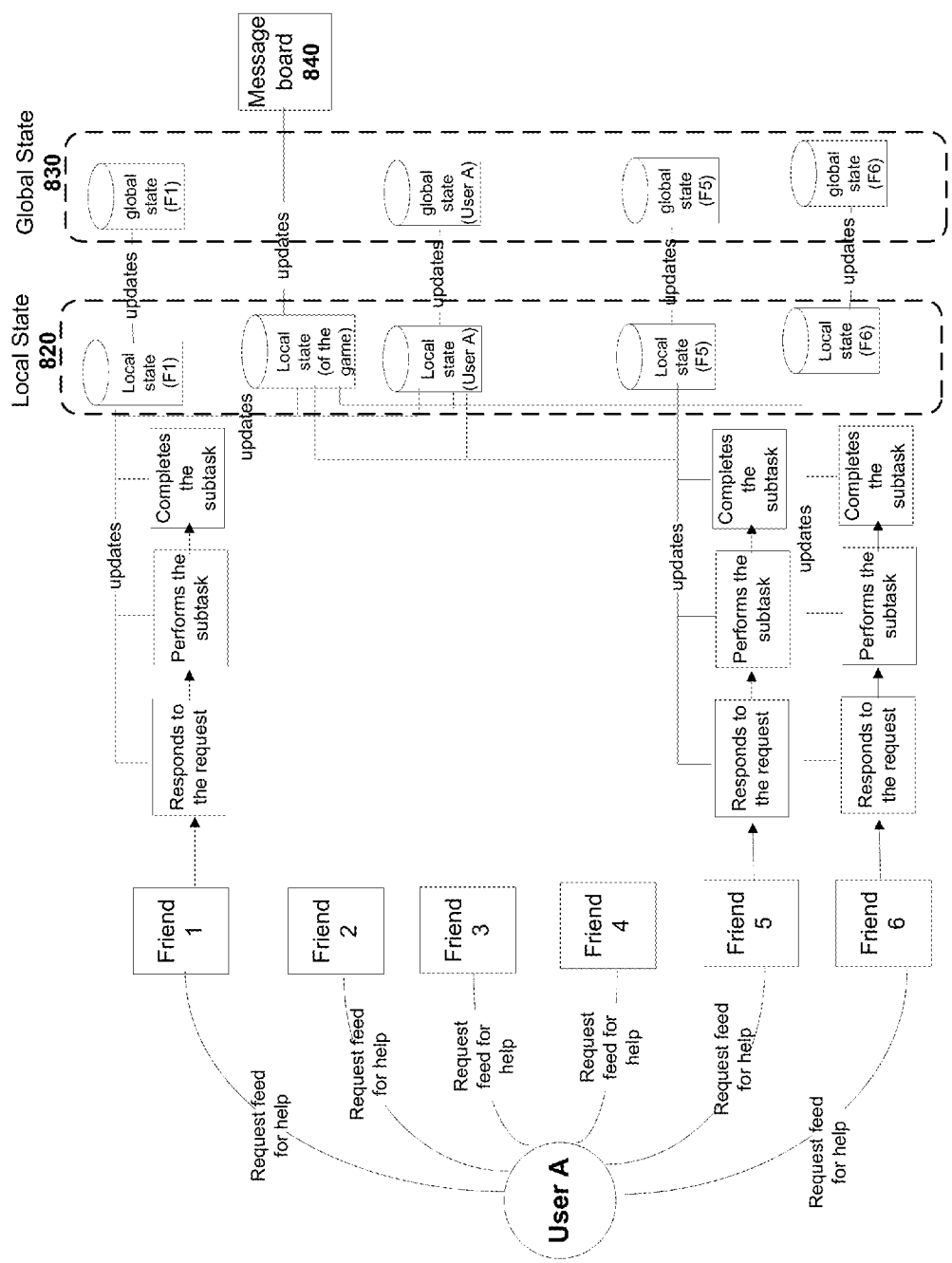
FIGS. 8a and 8b illustrate process flows for creating a crew to participate in missions of the online game, in one embodiment of the invention.
Figure 8B:
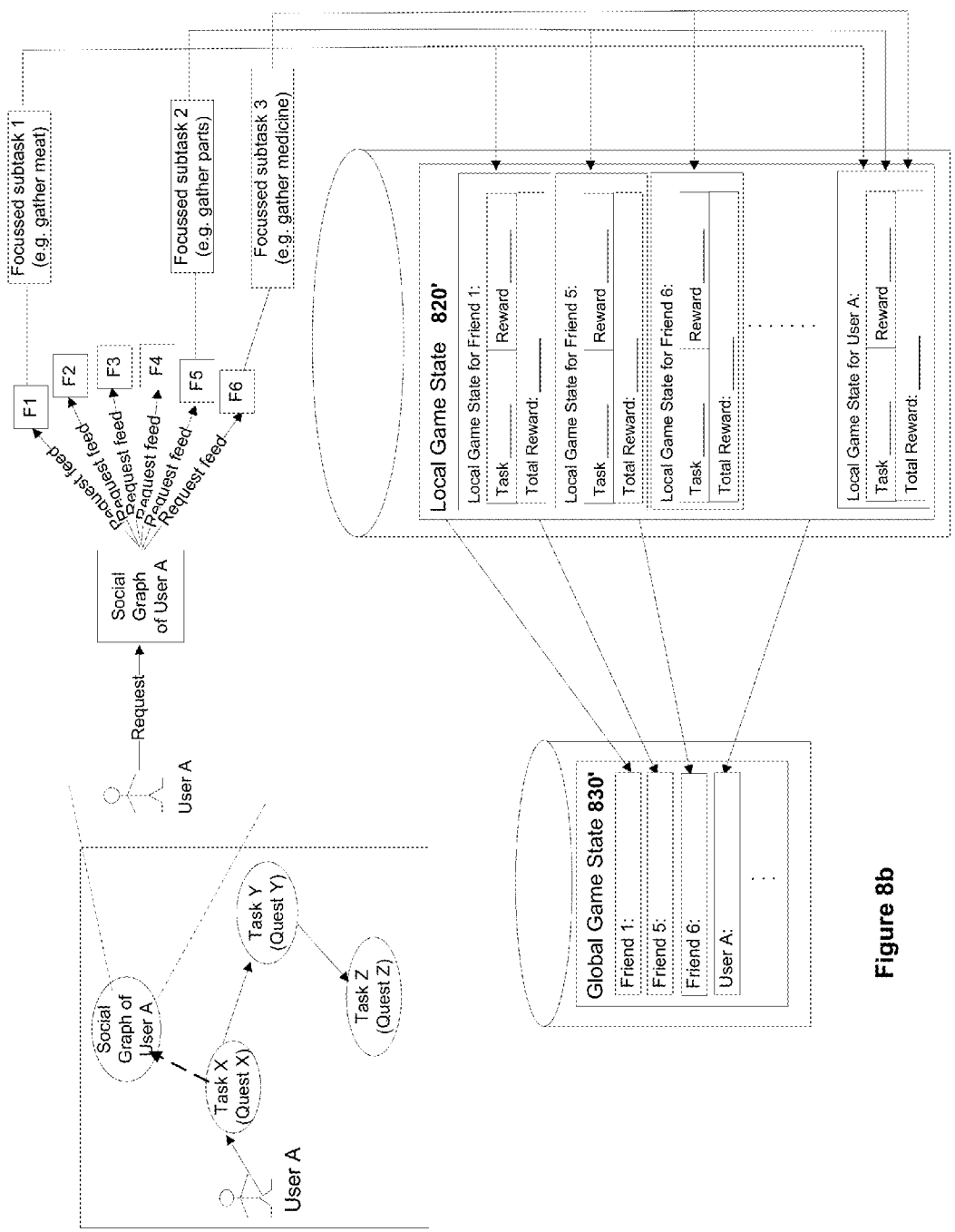

FIGS. 8a and 8b illustrate process flow for creating a crew for completing the missions of an online game. Referring to FIG. 8a, the process begins with a player, user A 810, initiating an online social game. In one embodiment, the online social game may be a Massive Multiplayer Online game (MMO game) such as "FarmVille™," "CityVille™," "FrontierVille™," etc., developed by Zynga, Inc., the assignee of the current application. Selection of a particular social game from a list of online social games may be accomplished using a web page as explained earlier with reference to FIG. 1. Upon activation of the online game, the player 810 may invite friends to help him complete his missions by sending a request feed to a list of friends using social graph data associated with the player, requesting the friends to join his crew. As mentioned earlier, there are many types of online social networks run and maintained by various companies, and any one of these companies can provide access to social graph data. In one embodiment, a request feed, as used in this application, refers to a request sent by a mission leader to one or more friends identified in his social graph, to join the mission leader's crew and such request is broadcast to the mission leader's friends as a "message feed". In this embodiment, the request feed entails two different interactions—a request from a user and a feed from the system to users in the social graph in response to the request. The request feed is one form that the mission leader follows to send requests to his friends. As a result, in other embodiments, the request from the mission leader may encompass various forms of messaging that results in mutually beneficial game interactions, such as a feed, a request, wall-to-wall messaging, email, etc.

When one or more friends respond to the request feed, the friends are recruited or "hired" to become part of the player's crew. Thus, in the example illustrated in FIG. 8a, upon activation of the online game by User A, request feed to join the crew is sent to friends F1, F2, F3, F4, F5 and F6. Friends, F1, F5 and F6 responded to the request and are hired to be part of the User A's crew.

Each member of the crew is assigned a distinct subtask associated with a task of the online game. In one embodiment, an algorithm associated with the social game is configured to monitor responses from friends and automatically assign subtasks within a task that needs to be accomplished in the online game to the friends in the order of receipt of the responses. The player, in one embodiment, may have the ability to override the automatic assignments of the algorithm by re-assigning the subtasks based on the social relation of the player with specific crew members. Each subtask identifies a specific focus and may need specific skills, tools, levels, or other game objects that a crew member owns to complete the subtask. The player, therefore, may reconfigure the automatic assignment done by the algorithm based on the skills/tools of the crew members in order to ensure that the assigned subtasks can be completed successfully.

FIG. 10A illustrates a sample message board identifying various members that responded to the initial request feed and are part of the player's crew, in one embodiment of the invention. As shown, the various crew members are assigned a distinct subtask to complete. Each crew member is required to complete the assigned subtask or follow a task leader to complete the subtask. As mentioned earlier, exemplary task leaders, in one online game, such as FrontierVille™, may include a hunter who hunts for meat, a carpenter who collects parts and a doctor who collects medicine. In trying to accomplish the assigned subtask, a crew member may follow a hunter to gather meat, a carpenter to gather parts, or a doctor to collect medicine. In the embodiment illustrated in FIG. 10A, crew member Ashley is assigned to follow a hunter to gather meat and other related activities/subtasks, crew member Tatum is assigned to follow the doctor to gather medicine and crew member Bernie is assigned to follow a carpenter to gather parts. The player who initiated the online game is considered to be the "Trail Leader" or "Trail Boss." The trail leader tracks the progression made by each crew member with his/her assigned subtasks. In FIG. 10A, player Lauren is the trail leader for the online game.

Figure 10B:
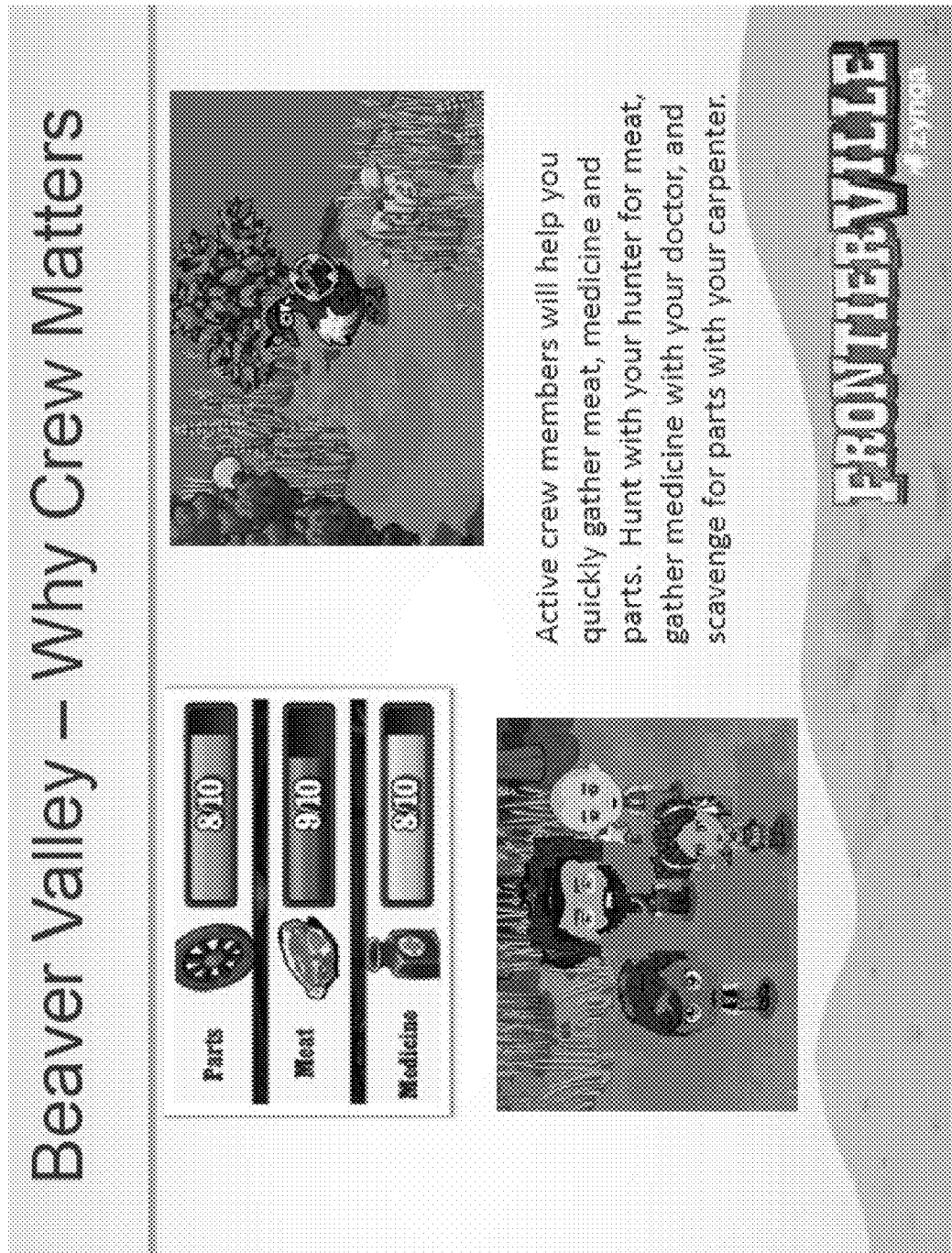

In one embodiment, when each crew member joins the game, the crew member's avatar may be unlocked so as to enable the crew members to interact with the trail leader and other members of the crew through interactions with the avatars. In addition to rendering the crew members for the online game, the message board may also be configured to present the avatar of each crew member when the crew is created and when providing status of the respective crew member, as illustrated in FIG. 10a. In one embodiment, the message board may be rendered using mission graphics to provide a status of the mission during the online game. In this embodiment, the mission graphics provide a visual rendition of the status of the various missions in the online game and may use the avatars of the various crew members. FIG. 10b illustrates an alternate embodiment, wherein the message board renders the status of each member of the crew including rewards/points awarded to the different members of the crew while each crew member is participating in completing the assigned task during the online game play.

In one embodiment, a player begins the game play with all non-player character (NPCs) roles related to a game play assigned to himself. In a game, such as FrontierVille™, mentioned in this application, the NPC roles may include a hunter, a doctor, and a carpenter. These NPC roles are exemplary and should not be considered restrictive. As mentioned earlier, the player initiating the game play is the trail leader. The trail leader then sends out invitations for friends to join his trail crew using social graph through feeds and requests. As and when a friend accepts an invitation to join the crew, an avatar for the friend is unlocked and the friend is assigned a specific subtask. The specific subtask may include assuming a specific NPC role within the game play so as to complete the subtasks assigned to the specific NPC role. Thus, in FrontierVille™, the friend may be assigned to take on the NPC role of a hunter, a carpenter or a doctor. The in-game avatar of the friend (i.e. crew member) takes over the assigned NPC role and works toward completing the subtasks related to the assigned NPC role. In one embodiment, rewards/points are awarded to the friend for joining the crew and accepting the designated NPC role. At this time, the friend does not have to perform any action unless he wants to. However, incentives are provided for the crew member and the trail leader to encourage the crew member to visit the mission challenge (i.e. trail) of the trail leader and additional incentives are provided for the crew member and the trail leader to participate in completing the subtasks. The participation may be in the form of interactions with virtual world objects, such as pile of wood, etc., in the game play. The incentives may be in the form of rewards, points, rations, energy and/or resources. As the trail leader encourages and fills each of the NPC roles of the game play, the trail leader may be awarded suitable rewards/points. For instance, as and when the trail leader fills an NPC role, his ration meter (i.e. energy capacity) or resource or points may be increased a pre-defined unit, such as 5 units. The rewards provided to the crew member for participating in the game play may be different from the reward provided to the trail leader for recruiting the crew member. In one embodiment, in addition to the initial awarding of the reward points the algorithm may also replenish the reward periodically or upon achieving specific levels/amount of the game play so long as the NPC roles remain filled and the assigned crew member is actively participating in the game play. In one embodiment, both the crew member and the task leader may be provided with appropriate incentives for continuing to encourage or actively participate in the online game. In one embodiment, the crew members may be "recruited" from a community of users that are willing to participate in the game play, such as a "Trail Pardners" community in the FrontierVille™ game, instead of recruiting members from the trail leader's social graph. In this embodiment, a community matchmaking feature may be used to match the crew members' interest to the trail leader's game play.

Still referring to FIG. 8a, the algorithm may use the assignment of subtasks to crew members to update a local state of each crew member and of the game. The algorithm monitors the progression made by each crew member in accomplishing the assigned subtasks and updates the respective local states accordingly. In one embodiment, the algorithm may have predefined points/rewards for responding to a request from a player, for embarking on an assigned subtask and for completing the subtask. In one embodiment of the invention, the subtask and the online game progresses when a crew member visits (i.e. accesses) the online game with the subtask progressing faster as the number of visits by the crew member to the online game increases.

For instance, in the "Clear the Campsite" mission in the online game FrontierVille™, when the crew member visits the online game during the progress of the mission, the crew member is awarded certain predetermined rewards/points and the same is credited to the crew member's local state. In another embodiment, the subtask and the online game progresses when the crew member visits the online game and the crew member performs certain actions towards completion of the subtask. For instance, for the same mission, "Clear the Campsite," the game progresses when the crew member visits the online game during the mission and the user performs the action of clicking on a pile of wood cut and stacked by the carpenter. As the subtask progresses, the crew member is awarded points/rewards. In one embodiment, the actions performed by a crew member are context sensitive. Consequently, the actions on particular world objects may be associated with specific crew members in order for the subtask to be considered complete for awarding points/rewards. For instance, a pile of wood stacked by a carpenter may require interaction, such as clicking, by a crew member following the carpenter in order for the subtask to be considered as completed and points/rewards awarded to the crew member and the player. In the same example, if a crew member following a hunter clicks on the same or different pile of wood within the task or within the challenge, no points are awarded to the crew member or the leader and the subtask may still show as incomplete.

The algorithm may compute the rewards for each crew member as a function of the activities performed by the crew member in relation to the assigned subtask and updates the local state of the crew member with the computed value. Thus, as illustrated in FIG. 8a, when a friend responds to the request from a player and becomes part of the crew, when the crew member performs the subtask, and completes the subtask, the algorithm monitors such activities and updates a local state of the friend (i.e. crew member). In addition to monitoring the activities of the crew member, the algorithm may also monitor inactivities of one or more crew members and update the local state of the corresponding crew members. The algorithm updates the local state of each crew member to reflect activity/inactivity of the crew member in relation to the online game. The updates may include any one or combination of, increase/decrease in an asset value, increase/decrease in awards, dynamic adjustment of the status, adjustment of skill level, and/or adjustment of any other object or characteristic related to the crew member.

In addition to updating the respective crew member's local state, the algorithm may also compute and update a local state of the player (i.e. trail leader) and local game state of the online game based on each crew member's activity/inactivity in relation to the assigned subtasks. In one embodiment, based on the crew members' activities/inactivities, the player may be awarded a proportional amount of rewards/points and such rewards/points are updated to the local state of the player (i.e. trail leader) and of the online game. The local game state of each crew member, player and of the online game, in one embodiment, may be stored in distinct databases, as illustrated in FIG. 8a by box 820, or in a single database, as illustrated in FIG. 8b by box 820', and updated periodically based on the progression made in the online game. The local game state of each crew member and of the player are used to update the corresponding global states of the crew members and the player. The global state of each crew member and player may be stored in one or more databases, as illustrated by box 830 in FIG. 8a and 830' of FIG. 8b. The one or more global state databases may be stored in one or more game servers. As a result, the updates to the global state of each crew member and player may be performed remotely using communication links.

Figure 11A:
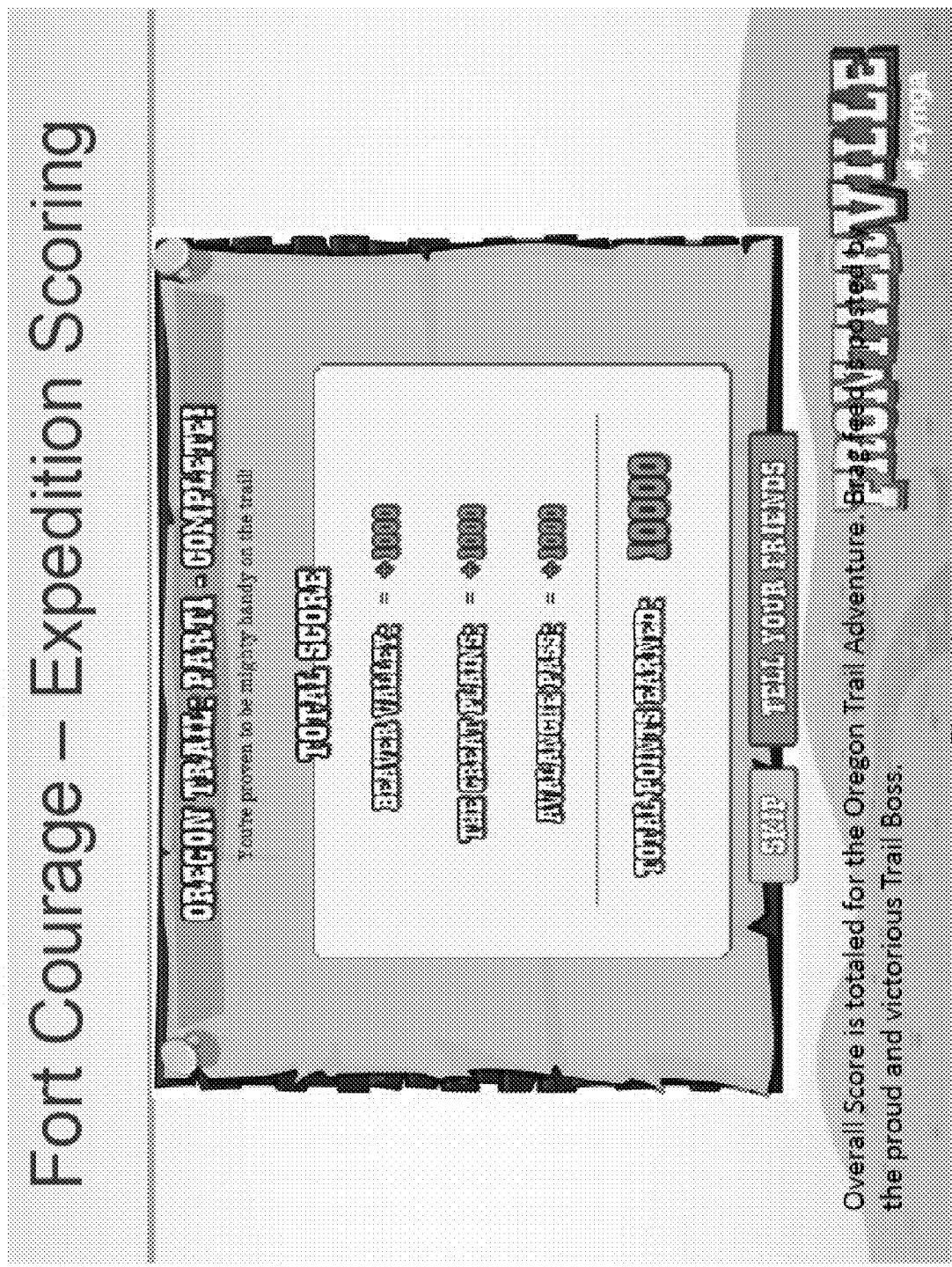
FIGS. 11a and 11b illustrate status of a quest and of the crew members that participated in the quest, in one embodiment of the invention.
Figure 11B:
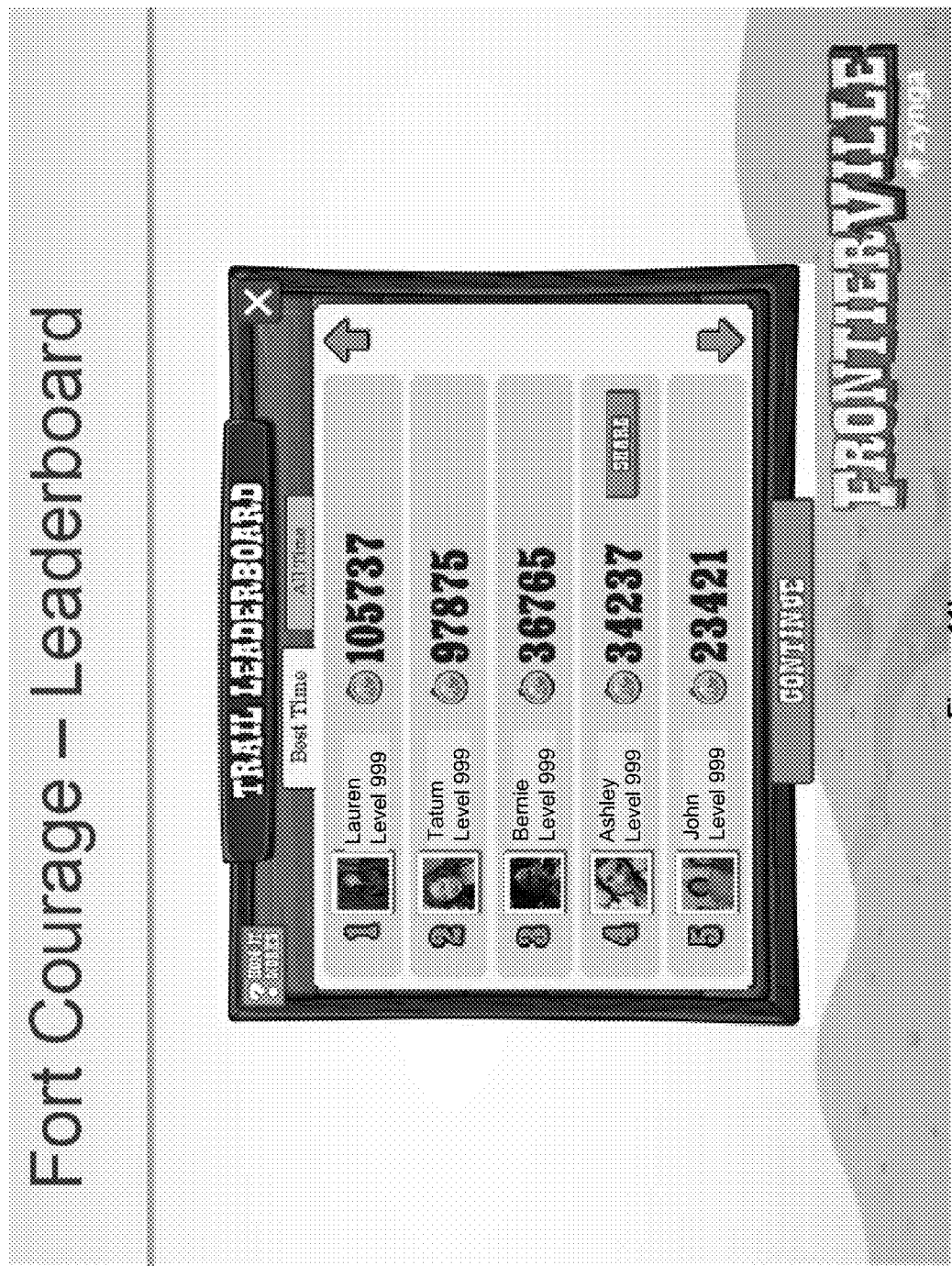

Continuing to refer to FIG. 8a, the algorithm of the online game tracks the progression of each task, crew member including player and the online game, as a whole, and renders the progression of each quest, task, crew member on the message board. The algorithm may use the local and/or global state of the crew member, player and the game to populate the message board to provide status of the online game. FIGS. 11A and 11B illustrate sample message board that is rendered providing status of the online game, in one embodiment of the invention. FIG. 11A illustrates the overall status of a game upon completion of a task/mission in a quest of the online game. FIG. 11B illustrates the local state of each crew member that identifies the progression made by each crew member. The message board is dynamically updated during the online game to provide up-to-date status of each crew member and each task of the online game.

Figure 12A:
FIGS. 12a, 12b, 12c and 12d illustrate a sample message board for crew interaction during online game play, in one embodiment of the invention.
Figure 12B:
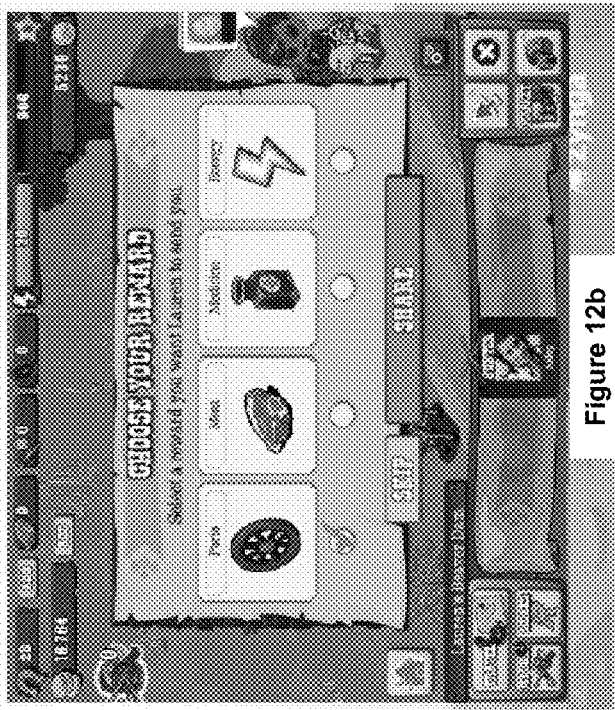

In addition to rendering game state of the online game, the message board may also be used for crew interaction. The message board may be used to leave messages by the trail leader to other crew members and for the crew members to leave messages to the trail leader or to other members of the crew. As illustrated in FIG. 12a, the trail leader leaves a welcome message and heaps rewards on a crew member for joining the trail leader's crew and for helping to contribute toward completion of the assigned subtasks. FIG. 12b illustrates a sample message that the crew member leaves for his trail leader after completing the assigned task.

Figures 12C, 12D:
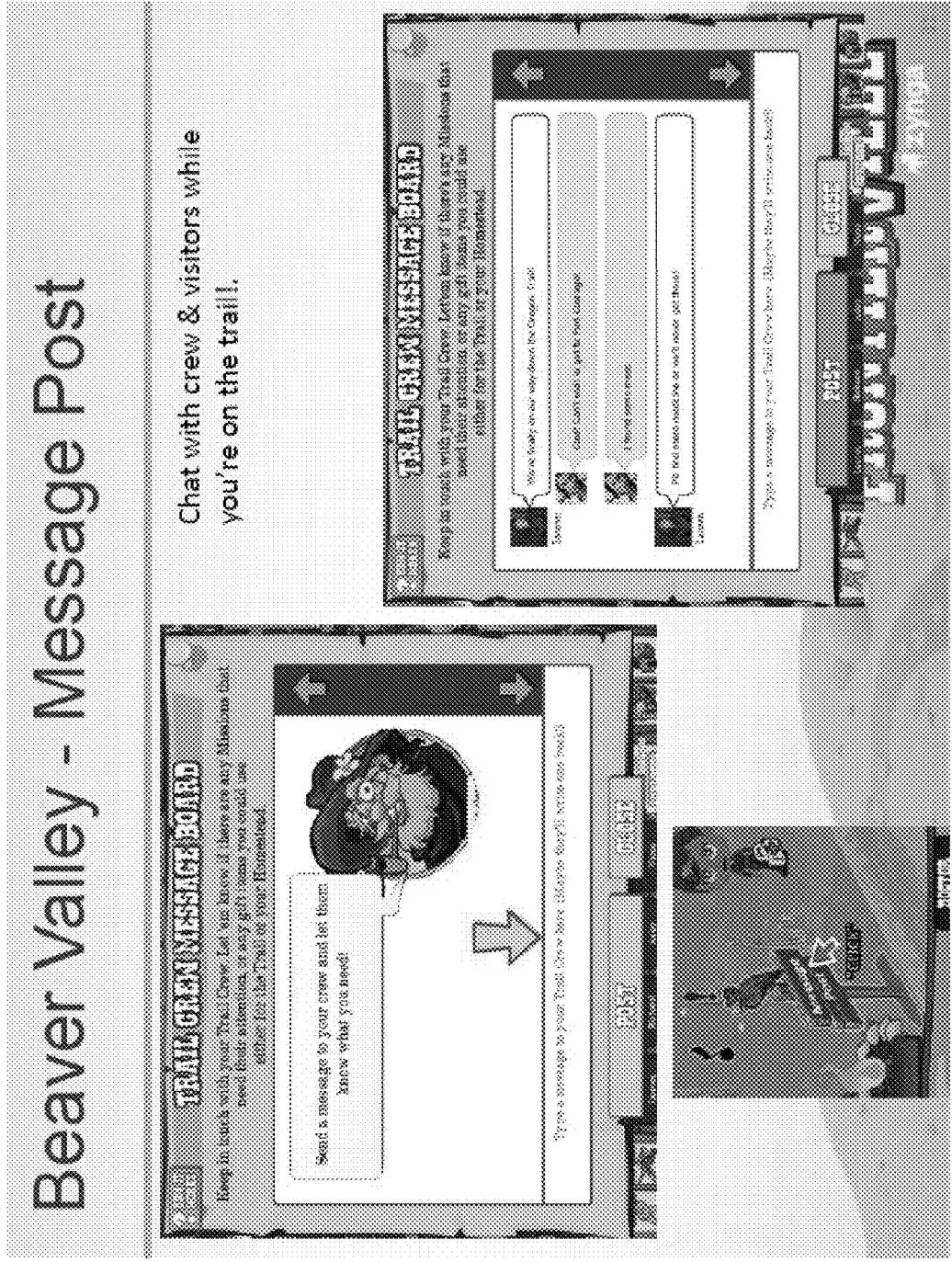

The message may be in the form of a status update or may be a gift request that the crew member expects from the trail leader for his contribution toward the progression of the online game. In order to enable a crew member to leave a gift request, the algorithm may recognize completion of the assigned subtask and present a list of awards available for selection based on the state of the crew member and of the game and allows the crew member to choose the gift that the crew member would like from the trail leader. FIG. 12c illustrates a sample message board that may be used for crew interaction, such as "chatting" with other crew members, etc.

FIG. 12d illustrates a sample interaction between the trail leader and other crew members during the online game. The message board can thus be used to motivate crew members to participate in missions using inspirational messages and to provide status of the game play.

Figure 13A:
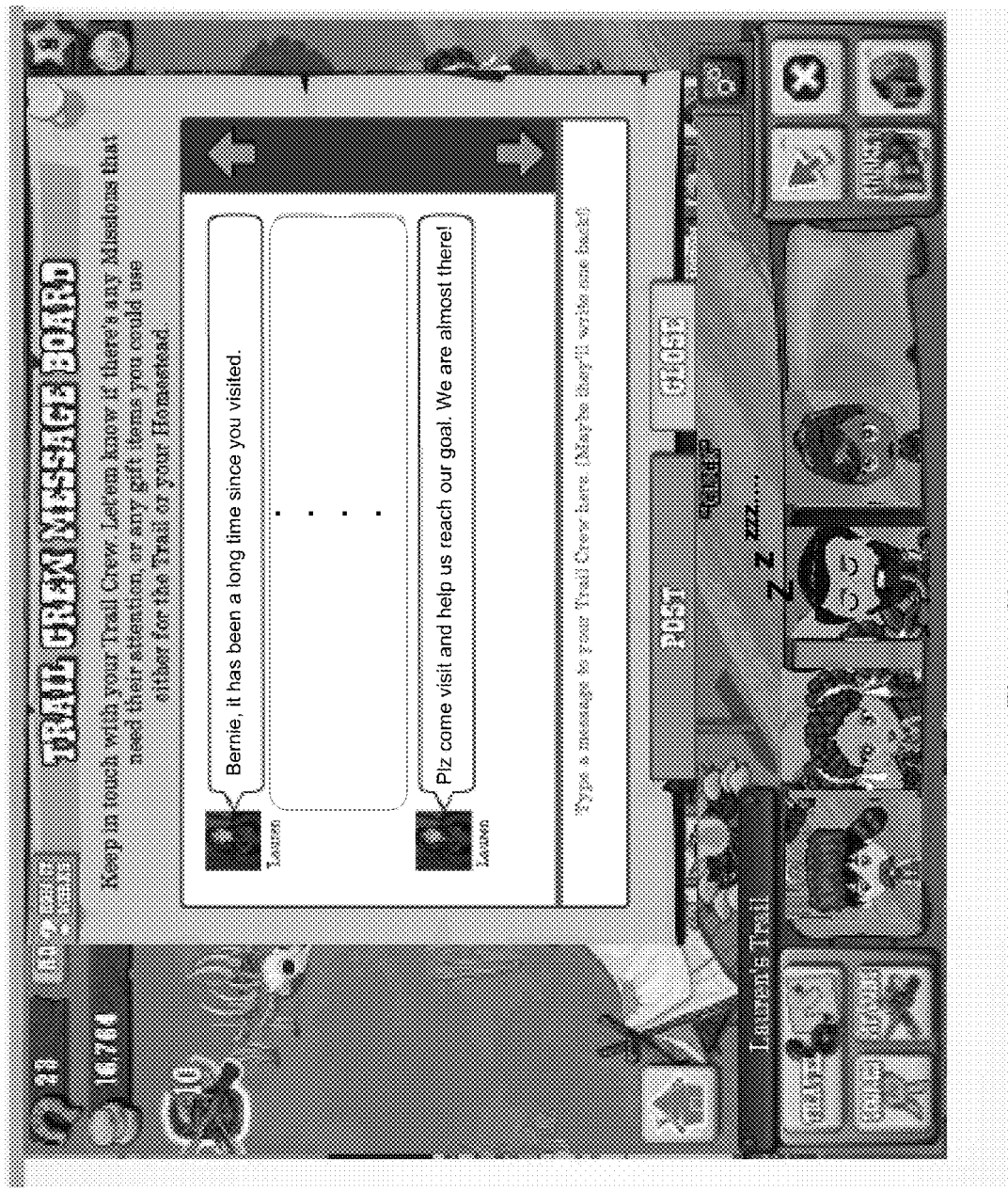
FIGS. 13a and 13b illustrate an embodiment of a webpage depicting changes in crew member status and firing/hiring of crew members during online game play, in one embodiment of the invention.
Figure 13B:
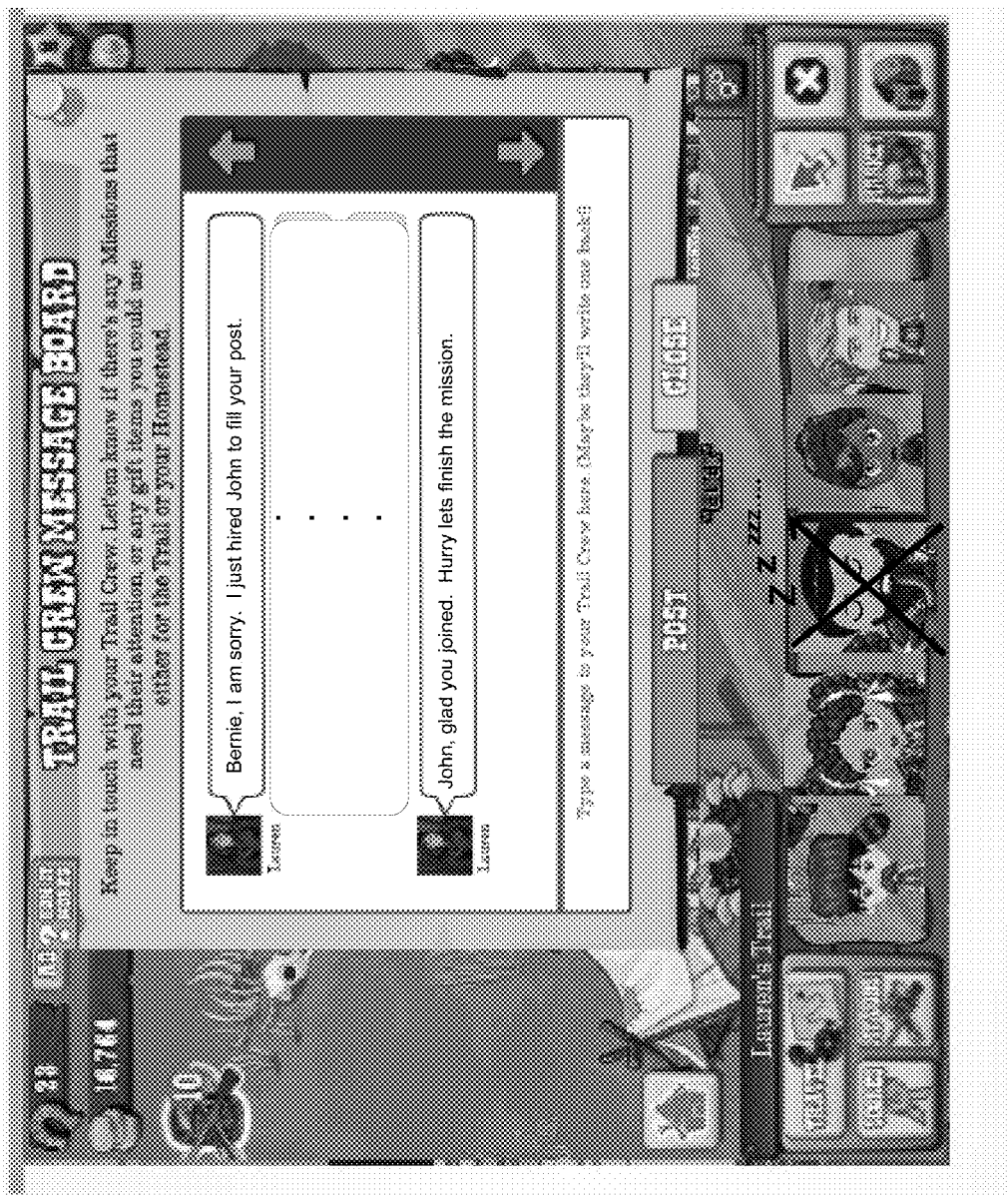

Still referring to FIG. 8a, in one embodiment, the algorithm tracks the activity of each crew member and adjusts the representation of the avatar of the respective crew member accordingly. For instance, one or more expressions on the avatar may be adjusted to reflect the social relation of the crew member with the trail leader. When a crew member has become inactive and has not contributed to the progression of the assigned subtasks, the expression of the avatar of the corresponding crew member is dynamically adjusted to indicate this inactivity. For example, when a crew member has not visited the online game for an extended period of time, the avatar of the crew member is adjusted by the algorithm to show a sleeping crew member, as illustrated in FIG. 13a.

It should be noted in this example, that the avatars of the other crew members who are actively participating in the assigned subtasks are left untouched. In the case where a crew member falls asleep and is slacking off, the trail leader is provided with the ability to nudge the crew member to become active and contribute towards completion of the assigned subtasks. In one embodiment, the algorithm provides a control to enable the trail leader to "poke" the avatar of the crew member and send a message through the message board to the slacking crew member to become more active and to help with the completion of the assigned subtask. A sample message accompanying the poking is illustrated in FIG. 13a.

In one embodiment, when a crew member is non-responsive and is not participating in the online game, the algorithm provides the trail leader with a control to enable the trail leader to fire the non-responsive crew member and a control to hire a new crew member to replace the non-responsive crew member. Still referring to FIG. 13a, when the trail leader encounters a non-active crew member who is slacking off, the trail leader may nudge the crew member to become active. Even after repeated nudging, if the crew member is still non-responsive, the trail leader may "fire" the crew member and replace him with a new crew member. Thus, in one embodiment, in addition to adjusting the expression on the non-responsive crew member's avatar when a non-responsive crew member is encountered, the algorithm may activate a control button to "fire" the non-responsive crew member. Additionally, the algorithm may provide a control button to "hire" a new crew member. In one embodiment, the algorithm may indicate the number of nudges that the trail leader has to perform or the amount of time that the trail leader needs to wait before firing the non-responsive crew member. When the non-responsive crew member is fired, his/her avatar is locked so that interactions with the avatar are suspended. Additionally, the local and global states of the crew member are updated to reflect the firing and to prevent additional updates to the fired crew member's local and global states.

When a new crew member is to be hired to replace the fired crew member, the algorithm may select one of the friends that had previously responded to the initial request feed but had not been hired during initial crew creation to become the new crew member. Alternately, a new request feed may be sent out to the friends in the player's social graph and a new crew member hired based on the response to the request feed. In either case, the new crew member is assigned the task that was originally assigned to the non-responsive crew member so that the new crew member can pick up from where the fired crew member left off and complete the assigned subtasks. In response to the hiring of the crew member, the avatar of the new crew member is unlocked to enable interaction with other crew members. Additionally, the local/global states of the new crew member, the player and the game state are updated to reflect the hiring. Such changes may also be rendered on the message board when providing status of the online game.

The algorithm thus provides the ability for a trail leader to delegate subtasks within a mission to a plurality of crew members so that the missions can be completed in a fast and efficient manner. The algorithm also provides the trail leader with the ability to monitor and manage the progression of the subtasks assigned to different members of the crew, nudge the non-responsive crew members to become active and contribute toward completion of the assigned subtasks, fire non-responsive crew members and hire additional crew members to complete his/her mission faster. As the crew members complete the subtasks in parallel, the trail leader is able to complete the quest in record time.

With the faster completion of the quests, additional levels may be unlocked thereby allowing the trail leader to take on higher challenges leading to greater user satisfaction. In addition, expressions on the avatars of the crew members are updated to reflect the current state of the crew members and their social relation with the player (i.e. trail boss) in the online game. It should be noted that the algorithm used in the description of various embodiments is exemplary and should not be considered restrictive. As a result, embodiments described herein for assembling the crew to complete tasks can also utilize the algorithms defined in U.S. patent application Ser. No. 13/079,775 filed Apr. 4, 2011, entitled "Apparatus, Method and System for Crew Mechanics in Multiplayer Games," which is incorporated herein by reference.

Figure 14:
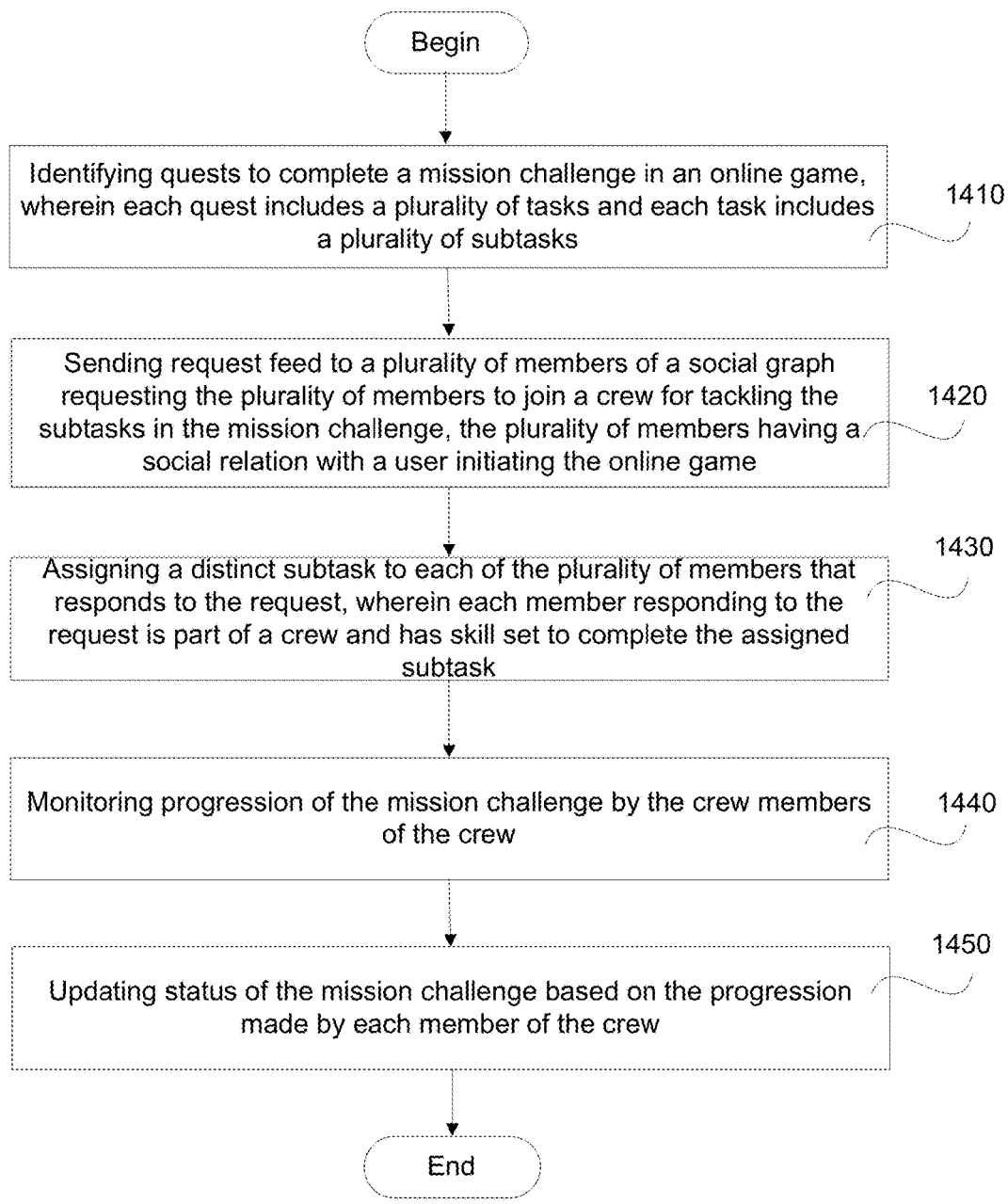
FIG. 14 illustrates a flow chart of various operations involved in creating a crew for an online game, in accordance with one embodiment of the invention.

FIG. 14 illustrates a flowchart of various operations of a method for creating a crew for participating in a quest in an online game, in one embodiment of the invention. The method begins at operation 1410, wherein an online game is identified by a user. The online game includes a plurality of quests, with each quest having multiple tasks and each task having one or more subtasks. The online game can be selected by a user using a webpage described with reference to FIG. 1. Upon receiving a selection of the online game from a player, a request feed is forwarded to a plurality of friends of the player requesting help in completing various subtasks within the online game, as illustrated in operation 1420. The plurality of friends may be identified using social graph data provided by any one of a social network site. The social graph data identifies the social relation of the friends with the player. As and when friends respond to the request feed, the friend becomes part of the player's crew. One or more subtasks for a task/mission are identified and assigned to the friends, as illustrated in operation 1430. There could be more subtasks than the number of friends responding. In such a case, distinct subtasks may be assigned to each player in a chronological order of appearance of the subtasks in the online game and additional subtasks may be assigned to the crew members when the crew members complete the assigned subtasks. Alternately, there could be more friends than the number of subtasks. In this case, the subtasks may be assigned to each friend (i.e. crew member) in the order the friends responded to the request feed. The remaining friends may be used as alternates when one or more crew members fail to perform the assigned subtasks.

After assigning the subtasks to the crew members, progression of each crew member in accomplishing the assigned tasks are monitored, as illustrated in operation 1440. The monitoring may include monitoring user interactions at the missions and sending out periodic messages encouraging crew members for having made or for making progress in the assigned subtasks. The monitoring may also include sending out reminders to crew members who are slacking and to encourage them to participate in completing the assigned subtasks. The status of the mission including various tasks and subtasks are updated periodically during the online game play, as illustrated in operation 1450. The updating of the status may be in response to user interactions or lack thereof detected at the various subtasks or may be performed periodically. Such updates are captured and stored in each crew member's local and global states, the player's local and global states and the online game state. The local and game state may be rendered on a message board for sharing with members of the crew. The process of monitoring and updating would continue for the various quests in the online game so long as the player and the crew members are engaged in the online game.

Figure 15:
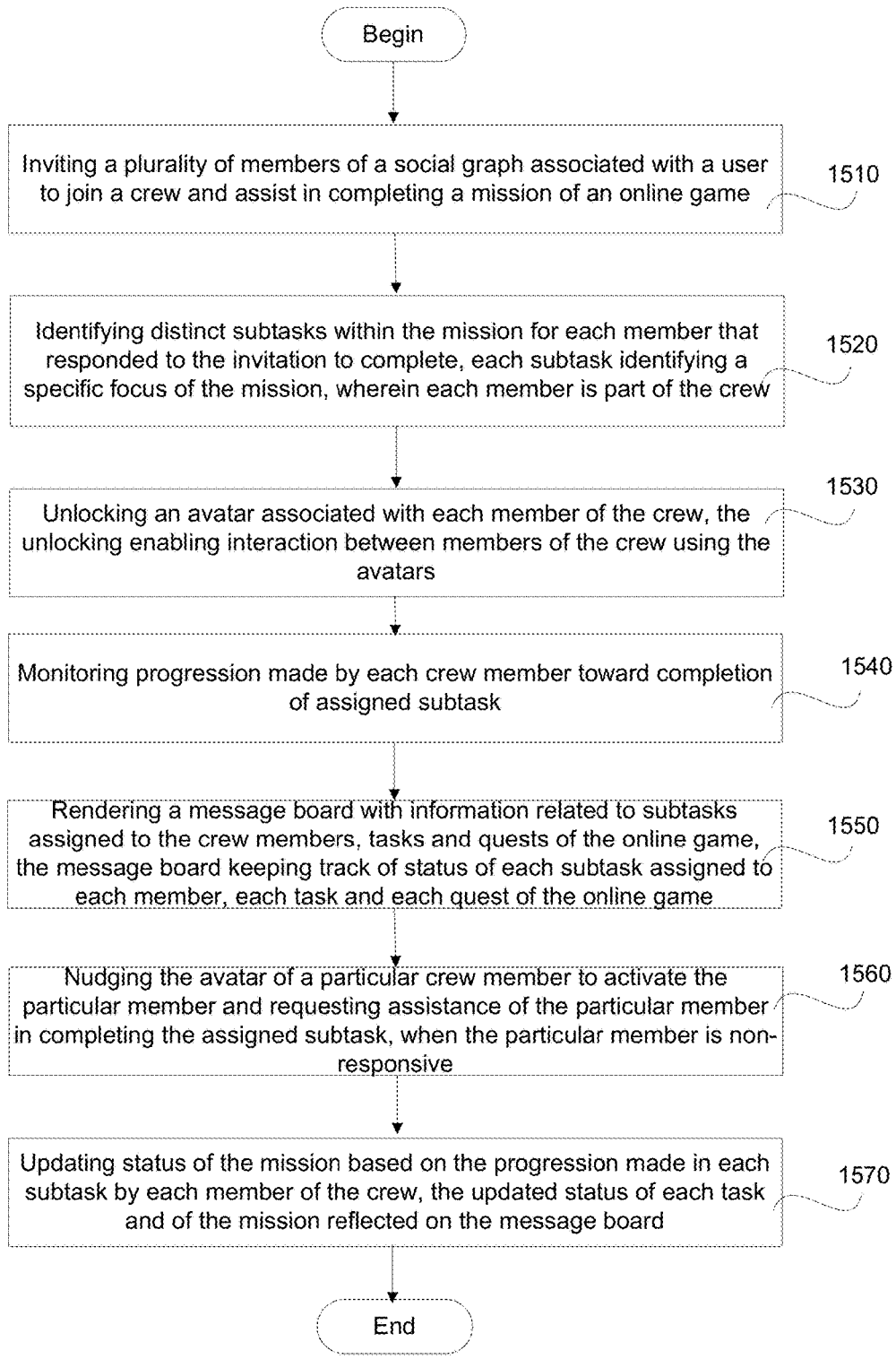
FIG. 15 illustrates flow chart of operations involved in creating a crew for participating in completing missions in an online game, in accordance with an alternate embodiment of the invention.

FIG. 15 illustrates a flowchart of various operations of a method for creating a crew for participating in a quest in an online game, in an alternate embodiment of the invention. The method begins at operation 1510, when a plurality of members identified from a social graph associated with a user who initiated the online game, are invited to join a crew and assist in completing a mission of the online game. The online game has a plurality of quests with each quest having a plurality of missions/tasks with each task having a plurality of subtasks. Each subtask may provide a specific focus. The invitation may be in the form of a request feed sent through a social network interface of the online game. When the members of the social graph respond to the invitation, they become part of the crew. Distinct subtasks are identified within each mission of the online game and assigned to the members as and when they respond to the request, as illustrated in operation 1520. As each subtask is assigned to the crew member, a corresponding avatar of the crew member is unlocked, as illustrated in operation 1530. The unlocking of the avatar enables the crew members to interact with each other during the online game play.

The actions and interactions of the crew members towards completion of the assigned subtask are monitored, as illustrated in operation 1540. The monitoring tracks not only the actions/interactions of crew members with other crew members but also tracks the lack of performance of one or more crew members. Information related to the creation of the crew and of the state of the online game are rendered on a message board and shared with the crew members, as illustrated in operation 1550. During monitoring, when a particular crew member is found to be non-responsive, the avatar representation of the crew member is adjusted to reflect the social relation of the crew member with the player of the online game. Thus, when a non-responsive crew member is encountered, expression of the avatar is adjusted to show a sleeping avatar.

The non-responsive crew member is "nudged" to encourage the crew member to become active and contribute toward completion of the assigned subtask, as illustrated in operation 1560. In one embodiment, a control is provided to enable nudging. The controls maybe be in the form of interactive menus or icons that may be selected by the user's avatar, or by way of a cursor or selection pointer, or a controller input device. The nudging may include "poking" the sleeping avatar of the non-responsive crew member and/or sending a reminder message to the non-responsive crew member using the message board. The nudging of the avatar may result in the crew member becoming active and contributing to the completion of the assigned task. Alternately, the nudging may not result in any response from the non-responsive crew member. In such case, the non-responsive crew member may be "fired" and a new crew member may be "hired" to fill the non-responsive crew member's spot in the online mission. The firing and hiring may be accomplished using available one or more controls.

The controls maybe be in the form of interactive menus or icons that may be selected by the user's avatar, or by way of a cursor or selection pointer, or a controller input device. The new crew member may be selected from the alternate crew members who responded to the initial request feed or a new request feed may be sent and the friend responding to the new request feed is hired to replace the fired crew member.

The status of the crew members and of the avatars are updated based on the actions/interactions of the crew members in the online game, as illustrated in operation 1570. The updates include updating of the local state of each crew member and of the player who initiated the online game, as well as the game state of each quest and task in the online game. The local state of the crew members, the player and the online game also reflect the firing and hiring of the crew members. As a result, the updating may include increase/decrease in asset values or increase/decrease in other object values associated with the crew members. The updates may be performed either periodically or in response to actions/interactions of the crew members in the online game. The status of the online game including status of each task and subtask, status of each crew member and of the player are updated on the message board and shared with the crew members.

The embodiments of the invention thus provide a tool to enable parallel execution of subtasks, to monitor and update the status of the online game including any avatar representations of the crew members thereby providing a more personal and interactive gaming experience.

Figure 16:
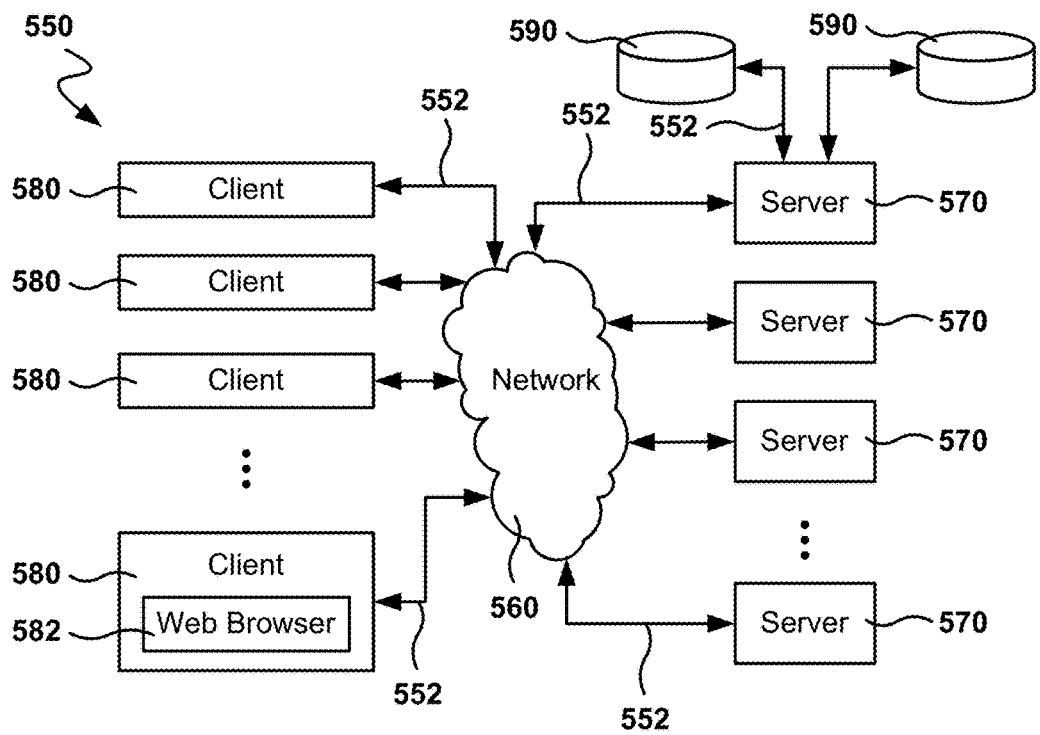
FIG. 16 illustrates an example network environment suitable for implementing embodiments of the invention.

Game Network Architecture:

FIG. 16 illustrates an example network environment 550 suitable for implementing embodiments of the invention. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HTML files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a netbook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as MICROSOFT INTERNET EXPLORER, GOOGLE CHROME, or MOZILLA FIREFOX, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 17:
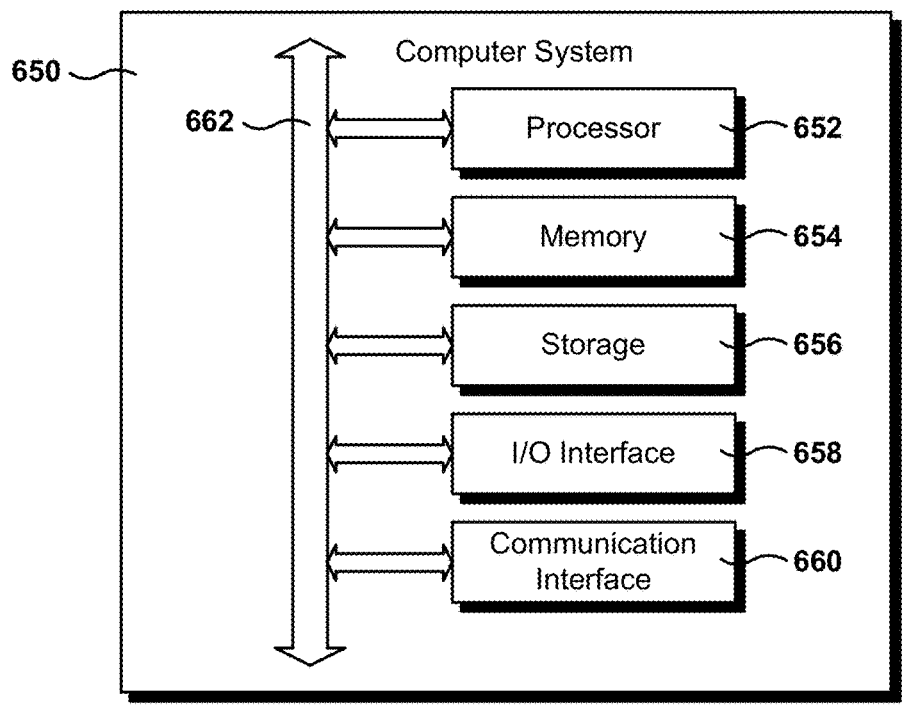
FIG. 17 illustrates an example computer system for implementing embodiments of the invention.

FIG. 17 illustrates an example computer system 650 for implementing embodiments of the invention. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As an example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute or data for processor 652 to operate on. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include an HDD, a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments of the present invention can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for creating a crew to participate in a challenge within an online game, comprising:
    identifying quests to complete the challenge, wherein each quest includes a plurality of tasks and each task includes a plurality of subtasks, each subtask identifies a distinct focus that requires a specific skill set for completing the subtask;
    sending a request feed to a plurality of members of a social graph of a user initiating the online game requesting the plurality of members of the social graph to join the crew for participating in completion of the tasks of the challenge, each of the plurality of members in the social graph being selected based on having a social relation with the user and having a skill set that is required for completing at least one of the plurality of subtasks, wherein the user is a mission leader managing the challenge;
    determining the skill set associated with each selected member that responds to the request feed, the selected member being part of the crew;
    automatically assigning a distinct subtask to each member of the crew by matching the skill set required for completing the subtask with the skill set of each member of the crew, the automatic assignment enabling each member of the crew to execute the subtasks independent of other members of the crew, wherein the automatic assignment is done without requiring any user interaction from the user or any member of the crew and the automatic assignment uses a process that accesses a numeric value computed for each member of the crew, wherein the numeric value is dynamically adjusted over time based on gameplay of each member;
    monitoring progression of the challenge based on progression made in the subtasks delegated to the members of the crew; and
    updating status of the challenge shared with members of the crew, based on the progression made by individual members of the crew, the updated status includes updating a local game state, a global game state, and an avatar representation associated with each member of the crew to reflect current activity state for the online game and a game state of the online game,
    wherein the method is executed by a processor.

2. The method of claim 1, wherein the skill set is an ability to perform a task or subtask to a defined level, the skill set includes one or more tools required for performing the task or subtask.

3. The method of claim 1, wherein the skill set of each member is dynamically adjusted over time based on the member's progress through the subtask of the online game.

4. The method of claim 1, further includes, providing controls for re-assigning a subtask to a different crew member based on social relationship between the mission leader and the members of the crew, wherein the re-assignment is performed by mission leader.

5. The method of claim 1, wherein updating status further includes,
    providing a message board for presenting status of the online game to the members of the crew, the message board identifying the various subtasks and the progression made by each member of the crew in completing delegated subtask.

6. The method of claim 5, wherein the message board is configured to enable interaction among members of the crew.

7. The method of claim 1, wherein managing progression further includes, awarding incentive to the crew member to participate and complete the delegated subtask.

8. The method of claim 7, wherein the incentive is any one of rewards, points, rations, energy, resource, or additional level of the online game.

9. The method of claim 1, wherein automatically assigning further includes,
    unlocking the avatar associated with each crew member, the unlocking of the avatar enabling interaction amongst the crew members of the crew.

10. The method of claim 1, wherein tracking progression further includes,
    determining an activity state of each crew member of the crew during the online game, the activity state used to identify level of activity toward completion of assigned subtask performed by the respective crew member and the mission leader in relation to the online game; and
    dynamically adjusting one or more expressions on the avatar of each respective crew member to reflect the activity state of the respective crew member, the adjustments to the avatar providing visual indication of social relation between the respective crew member and the mission leader.

11. A computer server platform for creating crew to participate in a challenge in an online game, the computer server platform including one or more game servers, wherein each game server includes:
    a memory for storing local game state of each member of a crew, local game state of a mission leader, game state of the online game; and
    a processor operable to execute an algorithm of the online game, wherein during execution of the online game the algorithm is configured to:
        identify quests, tasks within each quest and subtasks within each task for completing the challenge, wherein each subtask identifies a distinct focus that requires a specific skill set for completing the subtask;
        send a request feed to a plurality of members of a social graph of a user initiating the online game requesting the plurality of members of the social graph to join the crew for participating in completing the subtasks of the challenge, wherein the algorithm is configured to select each of the plurality of members in the social graph that has a social relation with the user and has a skill set that is specific for completing at least one of the plurality of subtasks, wherein the user is a mission leader managing the challenge;
        receive response to the request feed from one or more of the plurality of members of the social graph;

determine skill set associated with each selected member that responds to the request feed, the members being part of the crew;

automatically assign a distinct subtask to each member of the crew that responds to the request feed by matching the skill set required for completing the subtask with the skill set of each crew member that responds to the request, the automatic assignment enabling each member of the crew to execute the subtasks independent of other members of the crew, wherein the automatic assignment is done without requiring any user interaction from the user or any member of the crew and the automatic assignment uses a process that accesses a numeric value computed for each member of the crew, wherein the numeric value is dynamically adjusted over time based on gameplay of each member;

monitor progression of the challenge based on progression made in the subtasks delegated to the members of the crew; and update status of the challenge shared with members of the crew, based on the progression made by individual members of the crew, wherein the update includes updating the local game state, a global game state, and an avatar representation associated with each member of the crew and the game state of the online game.

12. The computer server platform of claim 11, wherein the computer server platform further includes:

a social networking server operable to interface with one or more social networks and provide information related to the social graph to the one or more game servers, the information identifying social relationship of the members in the social graph.

13. A non-transitory computer readable medium having program instructions that when executed by a computer implements a method for creating a crew to participate in a challenge in an online game, the program instructions comprising:

program instructions for identifying quests to complete the challenge, wherein each quest includes a plurality of tasks and each task includes a plurality of subtasks, each subtask identifies a distinct focus that requires a specific skill set for completing the subtask;

program instructions for sending a request feed to a plurality of members of a social graph of a user initiating the online game requesting the plurality of members of the social graph to join a crew for participating in completion of the tasks of the challenge, each of the plurality of members in the social graph being selected based on having a social relation with the user and having a skill set that is specific for completing at least one of the plurality of subtasks, wherein the user is a mission leader managing the challenge;

program instructions for determining the skill set associated with each selected member that responds to the request feed, the member being part of the crew;

program instructions for automatically assigning a distinct subtask to each member of the crew by matching the skill set required for completing the subtask with the skill set of each crew member, the automatic assignment enabling each member of the crew to execute the subtasks independent of other members of the crew, wherein the automatic assignment is done without requiring any user interaction from the user or any member of the crew and the automatic assignment uses a process that accesses a numeric value computed for each member of the crew, wherein the numeric value is dynamically adjusted over time based on gameplay of each member;

program instructions for monitoring progression of the challenge based on progression made in the subtasks delegated to the members of the crew; and program instructions for updating status of the challenge shared with members of the crew, based on the progression made by individual members of the crew, wherein updating status includes updating a local game state, a global game state, and the avatar representation of each member of the crew to reflect current activity state for the online game and a game state of the online game.

* * * * *